United States Patent
Vermani et al.

(10) Patent No.: US 11,805,428 B2
(45) Date of Patent: Oct. 31, 2023

(54) JOINT TRANSMISSIONS TO A STATION

(71) Applicant: QUALCOMM Incorporated, San Diego, CA (US)

(72) Inventors: Sameer Vermani, San Diego, CA (US); Bin Tian, San Diego, CA (US); Lin Yang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 16 days.

(21) Appl. No.: 17/525,687

(22) Filed: Nov. 12, 2021

(65) Prior Publication Data

US 2022/0078634 A1    Mar. 10, 2022

Related U.S. Application Data

(63) Continuation of application No. 16/515,978, filed on Jul. 18, 2019, now Pat. No. 11,206,554.
(Continued)

(51) Int. Cl.
*H04W 16/28* (2009.01)
*H04W 56/00* (2009.01)
(Continued)

(52) U.S. Cl.
CPC .......... *H04W 16/28* (2013.01); *H04L 1/1642* (2013.01); *H04L 25/0226* (2013.01); *H04W 56/001* (2013.01); *H04W 72/046* (2013.01)

(58) Field of Classification Search
CPC ..... H04W 72/00; H04W 84/12; H04W 48/12; H04W 48/00; H04W 72/046; H04L 25/03955; H04L 1/18; H04L 5/0023; H04L 5/0025; H04B 7/0617; H04B 7/0619; H04B 7/0697; H04B 7/063; H04B 7/0695; H04B 7/0408; H04B 7/0645; H04B 17/309

See application file for complete search history.

(56) References Cited

U.S. PATENT DOCUMENTS

| 2011/0158164 A1 | 6/2011 | Palanki et al. |
| 2011/0268217 A1 | 11/2011 | Gormley et al. |

(Continued)

FOREIGN PATENT DOCUMENTS

| CN | 103220023 A | 7/2013 |
| CN | 106533517 A | 3/2017 |

(Continued)

OTHER PUBLICATIONS

Taiwan Search Report—TW108125584—TIPO—dated Mar. 29, 2022.
(Continued)

*Primary Examiner* — Yee F Lam
(74) *Attorney, Agent, or Firm* — Holland & Hart LLP

(57) ABSTRACT

This disclosure provides systems, methods, and apparatuses for concurrently transmitting beamformed data from each of a plurality of access points (APs) to a wireless station (STA). In some implementations, the plurality of APs may operate as a distributed antenna array, and carrier signals of the plurality of APs may be synchronized with each other. A beamforming steering matrix may be determined for each of the plurality of APs, and beamformed data may be concurrently transmitted from each of the plurality of APs to the STA based on corresponding ones of the plurality of beamforming steering matrices.

22 Claims, 21 Drawing Sheets

Related U.S. Application Data

(60) Provisional application No. 62/715,155, filed on Aug. 6, 2018.

(51) Int. Cl.
*H04W 72/04* (2023.01)
*H04L 1/16* (2023.01)
*H04L 25/02* (2006.01)
*H04L 1/1607* (2023.01)
*H04W 72/044* (2023.01)

(56) References Cited

U.S. PATENT DOCUMENTS

| | | |
|---|---|---|
| 2012/0009964 A1 | 1/2012 | Gormley et al. |
| 2013/0286959 A1* | 10/2013 | Lou .................. H04L 5/0023 |
| | | 370/329 |
| 2014/0010319 A1 | 1/2014 | Baik et al. |
| 2014/0029465 A1 | 1/2014 | Nagata et al. |
| 2014/0056205 A1* | 2/2014 | Aboul-Magd ....... H04W 72/27 |
| | | 370/312 |
| 2014/0093005 A1 | 4/2014 | Xia et al. |
| 2014/0187259 A1* | 7/2014 | Kakani ................. G01S 5/08 |
| | | 455/456.1 |
| 2014/0328242 A1* | 11/2014 | Tong .................. H04W 72/046 |
| | | 370/312 |
| 2015/0109985 A1 | 4/2015 | Nagata et al. |
| 2015/0234033 A1 | 8/2015 | Jamieson et al. |
| 2016/0036572 A1 | 2/2016 | Bhanage et al. |
| 2016/0100396 A1 | 4/2016 | Seok |
| 2016/0119043 A1 | 4/2016 | Rajagopal et al. |
| 2016/0295513 A1 | 10/2016 | Moon et al. |
| 2016/0301452 A1 | 10/2016 | Kwon et al. |
| 2016/0334498 A1 | 11/2016 | Jamieson et al. |
| 2016/0344526 A1 | 11/2016 | Fan et al. |
| 2017/0373808 A1 | 12/2017 | Park et al. |
| 2018/0011179 A1 | 1/2018 | Zhang et al. |
| 2018/0205442 A1 | 7/2018 | Oteri et al. |
| 2018/0295601 A1* | 10/2018 | Wang ..................... G01S 1/44 |
| 2019/0349067 A1 | 11/2019 | Huang et al. |
| 2020/0008168 A1 | 1/2020 | Mudulodu |
| 2020/0037275 A1 | 1/2020 | Liu et al. |
| 2020/0045560 A1 | 2/2020 | Vermani et al. |

FOREIGN PATENT DOCUMENTS

| | | |
|---|---|---|
| WO | WO-2008074925 A1 | 6/2008 |
| WO | WO-2014066785 A1 | 5/2014 |
| WO | WO-2016011333 A1 | 1/2016 |
| WO | WO-2018009804 A1 | 1/2018 |

OTHER PUBLICATIONS

International Preliminary Report on Patentability—PCT/US2019/042631, The International Bureau of WIPO—Geneva, Switzerland, dated Feb. 18, 2021.

International Search Report and Written Opinion—PCT/US2019/042631—ISA/EPO—dated Sep. 20, 2019.

\* cited by examiner

1600

1610

JOINT TRANSMISSIONS TO A STATION

CROSS-REFERENCE TO RELATED APPLICATIONS

This patent application is a Continuation application and claims priority to U.S. patent application Ser. No. 16/515,978 entitled "JOINT TRANSMISSIONS TO A STATION" filed on Jul. 18, 2019, which claims priority to U.S. Provisional Patent Application No. 62/715,155 entitled "JOINT TRANSMISSIONS TO A STATION" filed on Aug. 6, 2018, all of which are assigned to the assignee hereof. The disclosures of all prior applications are considered part of and are incorporated by reference in this patent application.

TECHNICAL FIELD

This disclosure relates generally to wireless networks, and specifically to beamforming data transmissions from a plurality of first wireless communication devices to a second wireless communication device.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with APs in a Wi-Fi network may be referred to as wireless stations (STAs). In a typical WLAN, each STA may be associated with only one AP at a time, and relied upon its associated AP to transmit data to and receive data from the STA.

A plurality of APs may be connected to one another to form an extended BSS (ESS). For example, many office and home wireless networks configured to operate as an ESS may include a root AP and a number of satellite APs (such as relay or repeater APs). A plurality of APs may also be configured to operate as a mesh network. In a mesh network, the APs may be directly connected to each other in a non-hierarchical manner that allows the APs to cooperate with each other to efficiently route data to and from STAs. Mesh networks can dynamically self-organize and self-configure, which may reduce installation overhead and allow for dynamic load balancing. Such mesh networks may be referred to as Self-Organizing Networks (SONs).

SUMMARY

The systems, methods, and devices of this disclosure each have several innovative aspects, no single one of which is solely responsible for the desirable attributes disclosed herein.

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a first access point (AP) and may include synchronizing a carrier signal of the first AP with carrier signals of a plurality of other APs, determining a beamforming steering matrix for beamforming data transmissions to a wireless station (STA), and transmitting beamformed data to the STA based on the determined beamforming steering matrix concurrently with transmissions of beamformed data from each of the plurality of other APs to the STA. The first AP may synchronize itself with the plurality of other APs by synchronizing a phase of its carrier signal with a target phase or by synchronizing a frequency of its carrier signal with a target frequency.

Synchronizing the phase of the carrier signal may include receiving a series of synchronization signals each including a correction value indicative of a phase offset between the carrier signal of the first AP and a target carrier signal. In some implementations, synchronizing the frequency of the carrier signal may include receiving a frame including a plurality of sounding sequences, estimating the transmission frequency of the frame based on the plurality of sounding sequences or based on data symbols of the frame, and adjusting the frequency of the carrier signal based on the estimated transmission frequency. In other implementations, synchronizing the frequency of the carrier signal may include transmitting a series of frames to the STA during a time period, receiving correction information from the STA indicating at least one of changes in phase or changes in frequency during the time period based on the series of frames, and adjusting at least one of the phase or the frequency of the carrier signal based at least in part on the correction information. In some other implementations, synchronizing the frequency of the carrier signal may include receiving beacon frames transmitted from one or more of the other APs, determining frequency differences between carrier signals of the one or more other APs based on the received beacon frames, and adjusting the frequency of the carrier signal of the first AP based on the determined frequency differences.

The method may also include transmitting a test frame to the STA concurrently with transmissions of other test frames from the plurality of other APs to the STA, and receiving a feedback frame including a plurality of correction factors each indicating estimated phase differences between a beamformed channel linking the STA to the first AP and each of one or more other beamformed channels linking the STA to the plurality of other APs. In some implementations, the transmission of the test frame from the first AP may be based on the beamforming steering matrix determined for the first AP, and the concurrent transmissions of the other test frames from the plurality of other APs may be based on a corresponding plurality of beamforming steering matrices determined for each of the plurality of other APs.

Another innovative aspect of the subject matter described in this disclosure can be implemented in a wireless communication device. In some implementations, the wireless communication device may be an access point (AP) that includes at least one modem, at least one processor communicatively coupled with the at least one modem, and at least one memory communicatively coupled with the at least one processor. The memory stores processor-readable code that, when executed by the at least one processor in conjunction with the at least one modem, causes the AP to synchronize its carrier signal with carrier signals of a plurality of other APs, to determine a beamforming steering matrix for beamforming data transmissions to a wireless station (STA), and to transmit beamformed data to the STA based on the determined beamforming steering matrix concurrently with transmissions of beamformed data from each of the plurality of other APs to the STA. The AP may synchronize its carrier signal with carrier signals of the other APs by synchronizing a phase of the carrier signal with a target phase or by synchronizing a frequency of the carrier signal with a target frequency.

Synchronizing the phase of the carrier signal may include receiving a series of synchronization signals each including a correction value indicative of a phase offset between the carrier signal of the AP and a target carrier signal. In some implementations, synchronizing the frequency of the carrier signal may include receiving a frame including a plurality of sounding sequences, estimating the transmission frequency of the frame based on the plurality of sounding sequences or based on data symbols of the frame, and adjusting the frequency of the carrier signal based on the estimated transmission frequency. In other implementations, synchronizing the frequency of the carrier signal may include transmitting a series of frames to the STA during a time period, receiving correction information from the STA indicating at least one of changes in phase or changes in frequency during the time period based on the series of frames, and adjusting at least one of the phase or the frequency of the carrier signal based at least in part on the correction information. In some other implementations, synchronizing the frequency of the carrier signal may include receiving beacon frames transmitted from one or more of the other APs, determining frequency differences between carrier signals of the one or more other APs based on the received beacon frames, and adjusting the frequency of the carrier signal based on the determined frequency differences.

Execution of the instructions may also cause the AP to transmit a test frame to the STA concurrently with transmissions of other test frames from the plurality of other APs to the STA, and to receive a feedback frame including a plurality of correction factors each indicating estimated phase differences between a beamformed channel linking the STA to the AP and each of one or more other beamformed channels linking the STA to the plurality of other APs. In some implementations, the transmission of the test frame from the AP may be based on the beamforming steering matrix determined for the AP, the concurrent transmissions of the other test frames from the plurality of other APs may be based on a corresponding plurality of beamforming steering matrices determined for each of the plurality of other APs.

Another innovative aspect of the subject matter described in this disclosure can be implemented in a method for wireless communication. The method may be performed by a wireless station (STA) and may include receiving one or more sounding sequences from each of a plurality of access points (APs), estimating for each of the plurality of APs a carrier frequency of the AP based at least in part on the one or more corresponding sounding sequences, and transmitting, to each of the plurality of APs, correction information indicating a frequency offset between the carrier frequency of the AP and a target carrier frequency based at least in part on a corresponding one of the estimated carrier frequencies. The one or more sounding sequences may be contained in one or more of a null data packet announcement (NDPA) or a null data packet (NDP).

The method may also include receiving a null data packet (NDP) from each of two or more of the plurality of APs, and transmitting, to each of the two or more APs, a compressed beamforming report (CBR) based on a corresponding one of the received NDPs. In some implementations, the NDPs may be concurrently received from the at least two of the plurality of APs. In other implementations, the CBRs may be concurrently transmitted to the at least two of the plurality of APs. In addition, or in the alternative, the method may include receiving a beamformed test frame transmitted from at least two of the plurality of APs, estimating phase differences between beamformed channels across the at least two of the plurality of APs based on the beamformed test frame, and transmitting, to the at least two of the plurality of APs, a feedback frame including one or more correction factors indicating the estimated phase differences between the beamformed channels.

Another innovative aspect of the subject matter described in this disclosure can be implemented in a wireless communication device. In some implementations, the wireless communication device may be a wireless station (STA) that includes at least one modem, at least one processor communicatively coupled with the at least one modem, and at least one memory communicatively coupled with the at least one processor. The memory stores processor-readable code that, when executed by the at least one processor in conjunction with the at least one modem, causes the STA to receive one or more sounding sequences from each of a plurality of access points (APs) configured to operate as a distributed antenna array, to estimate, for each of the plurality of APs, a carrier frequency of the AP based at least in part on the one or more corresponding sounding sequences, and to transmit, to each of the plurality of APs, correction information indicating a frequency offset between the carrier frequency of the AP and a target carrier frequency based at least in part on a corresponding one of the estimated carrier frequencies.

BRIEF DESCRIPTION OF THE DRAWINGS

Like reference numerals refer to corresponding parts throughout the drawing figures.

DETAILED DESCRIPTION

Figure 1:
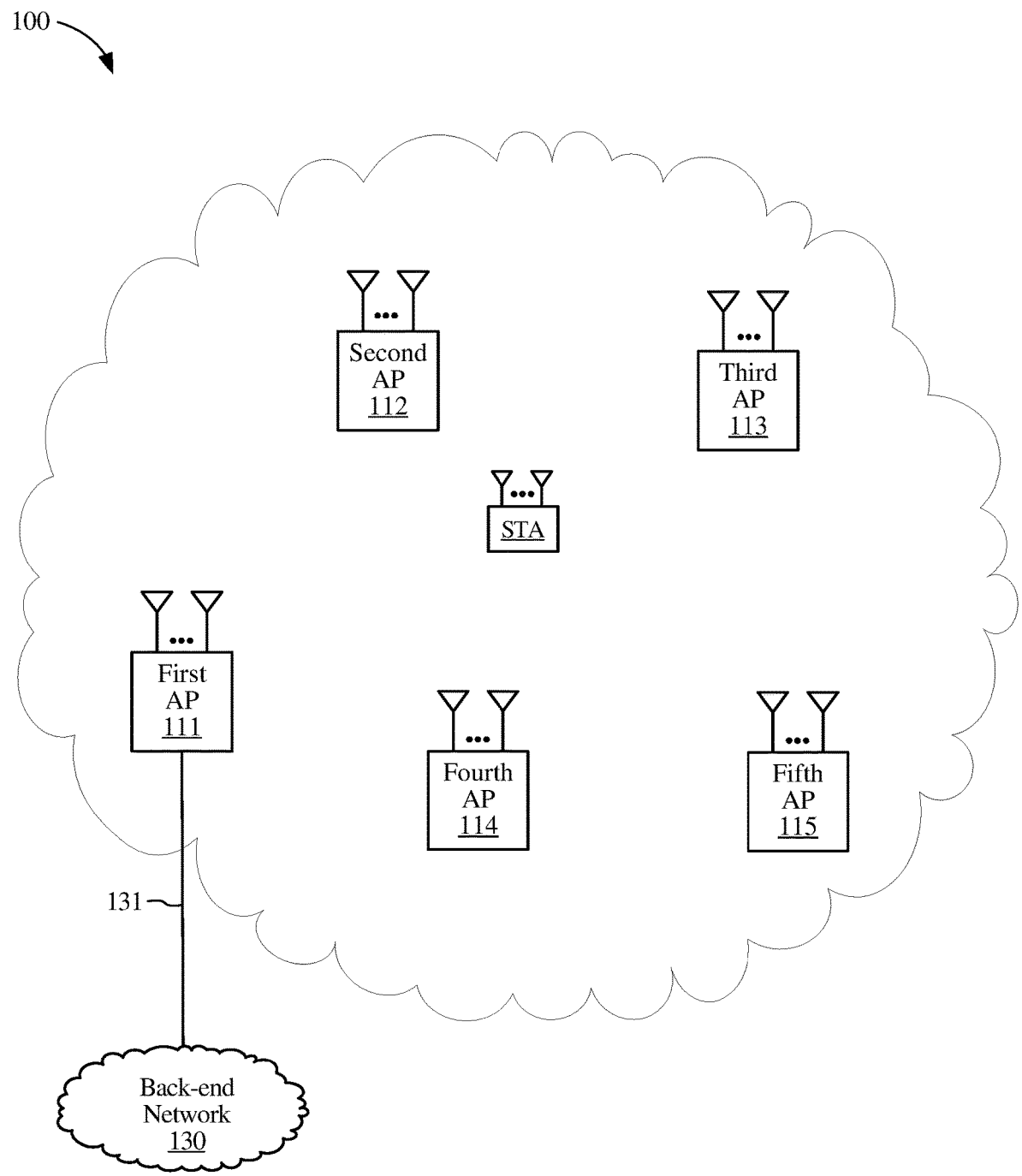
FIG. 1 is a block diagram of an example wireless network.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may allow multiple access points (APs) to beamform data transmissions to a single STA, which may increase data throughput and extend the wireless coverage area associated with the multiple APs (such as because of increases in power gain associated with beamforming). Each AP may have a separate transmit antenna array that, when aligned or coordinated with the transmit antenna arrays of the other APs, forms a distributed antenna array that can beamform data transmissions to the STA, even if each of the plurality of other APs includes only one transmit antenna. In some implementations, each of the plurality of APs may simultaneously transmit beamformed data to the STA based on a corresponding one of a plurality of beamforming steering matrices. In some aspects, the APs can generate the beamforming steering matrices and apply the beamforming steering matrices during data transmissions such that the simultaneous transmissions of beamformed data from the plurality of APs constructively interfere with each other at the STA, thereby improving the receive signal-to-noise ratio (SNR) at the STA.

Implementations of the subject matter described in this disclosure can be implemented to realize one or more of the following potential advantages. The ability to simultaneously transmit beamformed data from a plurality of APs to a STA may increase the beamforming gain and the power gain of data transmissions to the STA. For example, in a conventional self-organizing network (SON) including two APs each having four transmit antennas that transmit data to a STA using two spatial streams, the two-stream curve has a beamforming gain of 10*log 10(8/2)=6 dB. In contrast to such conventional wireless networks, aspects of the present disclosure may achieve beamforming gains of up to 10*log 10(NumAP) dB and may achieve power gains of up to 10*log 10(NumAP) dB, where "NumAP" refers to the number of APs that simultaneously transmit beamformed data to the STA.

As used herein, the term "beamforming steering matrix" refers to a matrix that describes the mapping of space-time streams to transmit antennas and for which the values have been determined using knowledge of the channel between transmitter and receiver with the goal of improving reception at the receiver.

FIG. 1 shows a block diagram of an example wireless system 100 within which aspects of the present disclosure may be implemented. The wireless system 100 is shown to include a number of wireless access points (APs) 110-115 and a wireless station (STA). The APs 110-115 may form a wireless local area network (WLAN) that allows the APs 110-115, the STA, and other wireless devices (not shown for simplicity) to communicate with each other over a wireless medium. The wireless medium may be divided into a number of channels, may be divided into a number of resource units (RUs), or both. The APs 110-115 may each include an assigned unique MAC address that is programmed therein by, for example, the manufacturer of the access point. Similarly, the STA also may be assigned a unique MAC address. In some implementations, the wireless system 100 may correspond to a multiple-input multiple-output (MIMO) wireless network, and may support single-user MIMO (SU-MIMO) and multi-user (MU-MIMO) communications. In some implementations, the wireless system 100 may support orthogonal frequency-division multiple access (OFDMA) communications.

The APs 110-115 may periodically broadcast beacon frames to enable the STA and other wireless devices within their wireless ranges to establish and maintain a communication link with the respective one of the APs 110-115. The beacon frames, which are typically broadcast according to a target beacon transmission time (TBTT) schedule, may include timing synchronization function (TSF) values of one or more of the APs 110-115. The STA may synchronize its own local TSF value with the broadcast TSF values, for example, so that the STA is synchronized with each other and with the APs 110-115.

The STA may be any suitable Wi-Fi enabled wireless devices including, for example, cell phones, personal digital assistants (PDAs), tablet devices, laptop computers, or the like. The STA also may be referred to as a user equipment (UE), a subscriber station, a mobile station, a mobile subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, or some other suitable terminology.

The APs 110-115 may be any suitable device that allows one or more wireless devices (such as the STA) to connect to another network (such as a local area network (LAN), wide area network (WAN), metropolitan area network (MAN), or the Internet). In some implementations, the STA and each of the APs 110-115 may include one or more transceivers, one or more processing resources (such as processors or ASICs), one or more memory resources, and a power source (such as a battery for the STA). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 8,9,10A, 10B, 10C, 11A, 11B, 11C, 12, 13A, 13B, 13C, 14, 15, 16A, and 16B.

The APs 110-115 may be configured to operate as a distributed antenna array when transmitting data to the STA (or to other wireless devices). In some implementations, each of the APs 110-115 may determine a beamforming steering matrix based on channel conditions between itself and the STA, and the APs 110-115 may simultaneously or concurrently transmit beamformed data to the STA based on their corresponding beamforming steering matrices. The beamforming steering matrices may be generated such that the simultaneous or concurrent transmissions of beamformed data from the APs 110-115 constructively interfere with each other at the STA, for example, thereby increasing the effective transmit power of the associated AP. In some implementations, each of the APs 110-115 may perform precoding (such as by applying beamforming matrix multiplication) on the data to be transmitted to the STA using its corresponding beamforming steering matrix. In other implementations, pre-coded data may be provided to the APs 110-115 by a central controller (not shown for simplicity).

In some implementations, the APs 110-115 may synchronize themselves with each other so that the beamformed data transmissions from each of the APs 110-115 are constructively added at the STA (such as rather than destructively interfering with each other). For example, if the phase offsets of the carrier signals of the APs vary by more than a value between the time at which the channel conditions were estimated and the time at which the APs 110-115 simultaneously or concurrently transmit the beamformed data to the STA, then the beamforming gain may decline and degrade performance. In some implementations, the APs 110-115 may synchronize the phases of their carrier signals based on a series of synchronization signals that are transmitted by one of the APs (such as a master AP) or by a central controller. The synchronization signals may allow the APs 110-115 to synchronize their respective carrier signals with the carrier signal used to transmit the synchronization signals and thereby align their frequencies and/or phases closely with each other. In addition, or in the alternative, the APs 110-115 may synchronize the phases and frequencies of their carrier signals with each other by listening to the beacon frames broadcast from a selected one of the APs 110-115, and using information contained in or derived from the beacon frames to align the phase and frequency of a respective carrier signal with the phase and frequency of the carrier signal used to transmit the beacon frames.

In some implementations, each of the APs 110-115 may define its own Basic Service Set (BSS), and all client devices associated with a given AP may be included within the given AP's BSS. In other implementations, the APs 110-115 may form an Extended Basic Services Set (ESS), and all client devices associated with the APs 110-115 may be included within the ESS. In some other implementations, the APs 110-115 may form a mesh network.

The first AP 110 may be connected to a back-end network 130 via a wired connection 131 (or alternatively via a wireless connection). The back-end network 130 may be, for example, a local area network (LAN), wide area network (WAN), metropolitan area network (MAN), the Internet, or any combination thereof. Further, although not shown for simplicity, the wireless network 100 may include a central controller that can send instructions and data to the APs 110-115. The central controller may be connected to the APs 110-115 via either wired connections or wireless connections.

Figure 2:
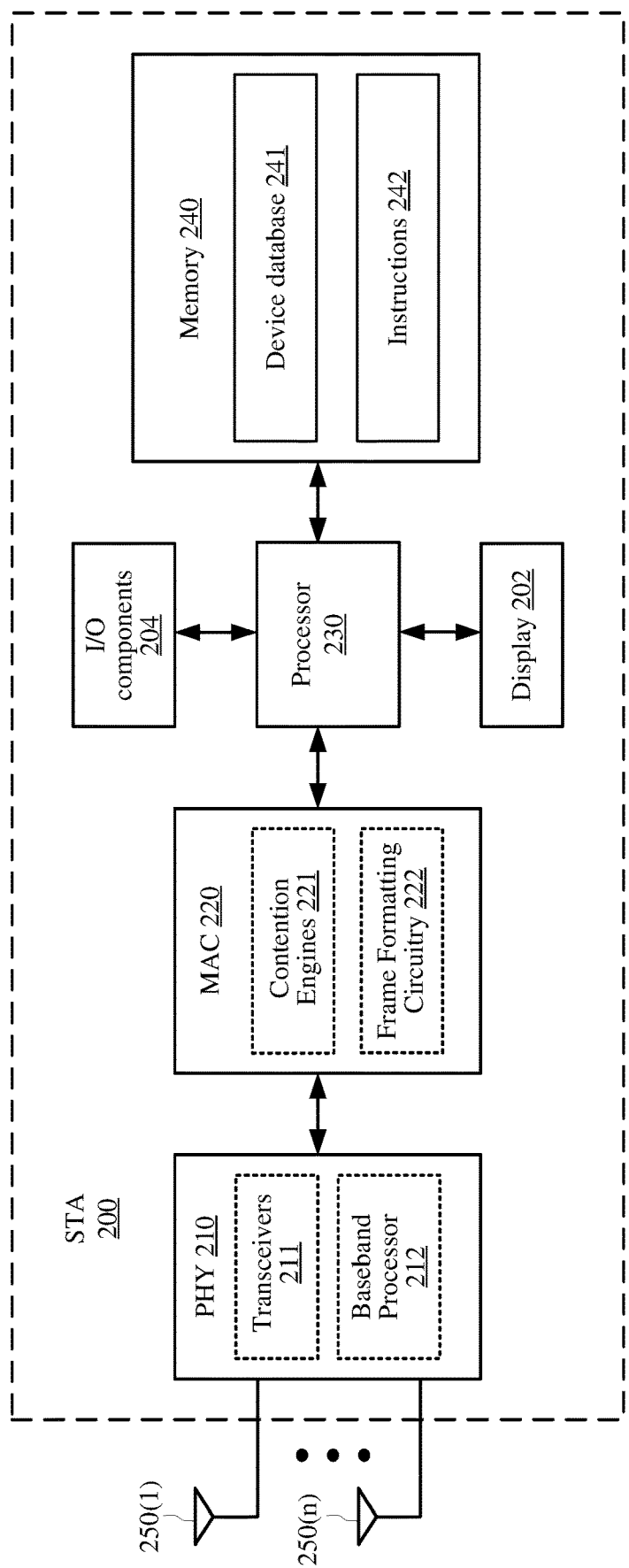
FIG. 2 is a block diagram of an example wireless station.

FIG. 2 shows an example station (STA) 200. In some implementations, the STA 200 may be one example of the STA of FIG. 1. The STA 200 may include a display 202, input/output (I/O) components 204, a physical-layer device (PHY) 210, a MAC 220, a processor 230, a memory 240, and a number of antennas 250(1)-250(n).

The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 2000. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(n), either directly or through an antenna selection circuit (not shown for simplicity). The transceivers 211 may be used to transmit signals to and receive signals from the AP 110 and other STAs (see also FIG. 1), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided for in the IEEE 802.11ax standards.

The baseband processor 212 may be used to process signals received from the processor 230 or the memory 240 (or both) and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230 or the memory 240 (or both).

The MAC 220 may include at least a number of contention engines 221 and frame formatting circuitry 222. The contention engines 221 may contend for access to one more shared wireless mediums, and may also store packets for transmission over the one more shared wireless mediums. The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in memory 240 or stored in memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices such as APs and other STAs. The profile information for the STA 200 may include, for example, its MAC address, the BSSID of the basic service set to which the STA 200 belongs, bandwidth capabilities, supported channel access mechanisms, supported data rates, and so on. The profile information for a particular AP may include, for example, the AP's basic service set identification (BSSID), MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 240 may also include a non-transitory computer-readable medium (such as one or more nonvolatile memory elements, such as EPROM, EEPROM, Flash memory, a hard drive, and so on) that may store computer-executable instructions 242 to perform all or a portion of one or more operations described in this disclosure.

The processor 230 may be one or more suitable processors capable of executing scripts or instructions of one or more software programs (such as instructions 242) stored within the memory 240. In some implementations, the processor 230 may be one or more general purpose processors that execute the instructions 242 to cause the STA 200 to perform any number of different functions or operations such as, for example, one or more operations of FIGS. 8, 9, 10A, 10B, 10C, 11A, 11B, 11C, 12, 13A, 13B, 13C, 14, 15, 16A, and 16B. In additional or alternative aspects, the processor 230 may include integrated circuits or other hardware to perform functions or operations without the use of software. While shown to be coupled to each other via the processor 230 in the example of FIG. 2, the processor 230, the display 202, the I/O components 204, and the MAC 220 may be coupled to one another in various arrangements. For example, the processor 230, the display 202, the I/O components 204, and the MAC 220 may be coupled to each other via one or more local buses (not shown for simplicity).

Figure 3:
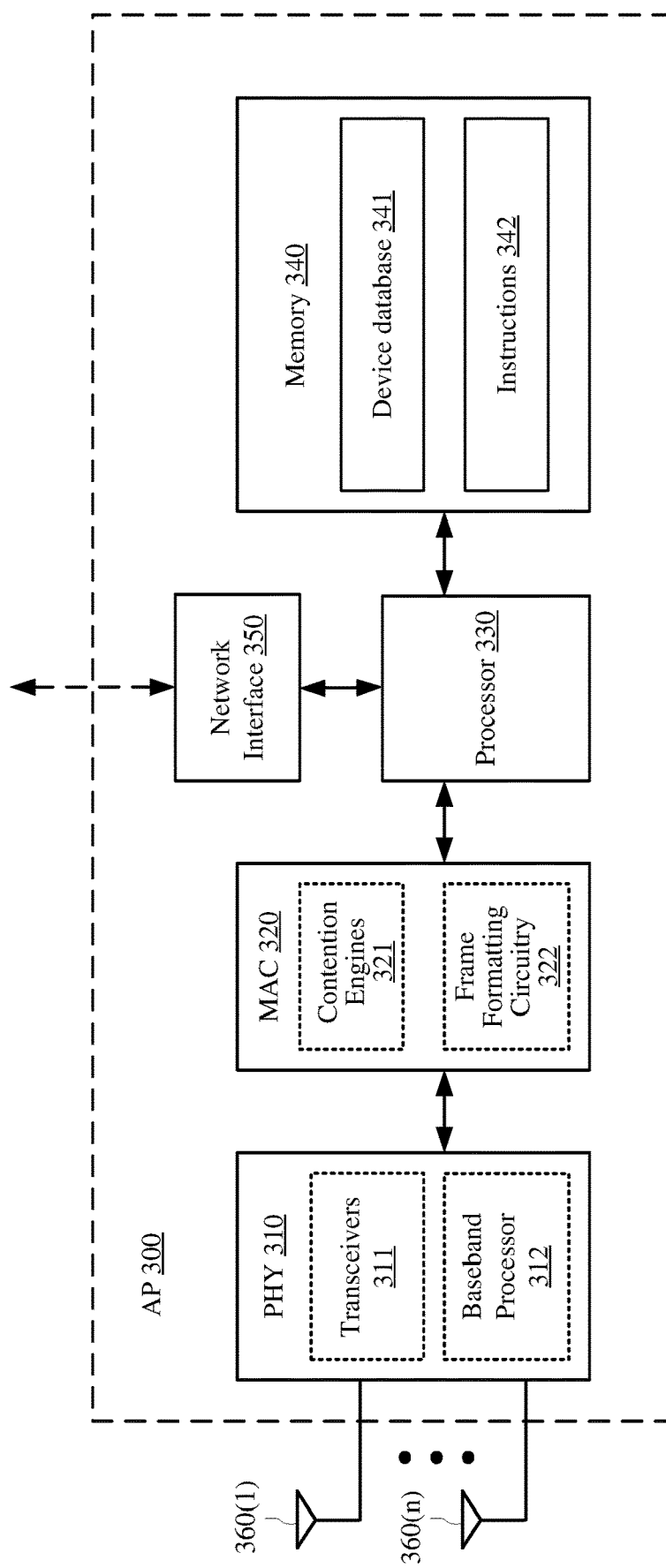
FIG. 3 is a block diagram of an example access point.

FIG. 3 shows an example AP 300. The AP 300 may be one implementation of one or more of the APs 110-115 of FIG. 1. The AP 300 may include a PHY 310, a MAC 320, a processor 330, a memory 340, a network interface 350, and a number of antennas 360(1)-360(n). The PHY 310 may include at least a number of transceivers 311 and a baseband processor 312. The transceivers 311 may be coupled to the antennas 360(1)-360(n), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(n), and may include any number of receive chains to process signals received from the antennas 360(1)-360(n). In some implementations, the AP 300 may be configured for MIMO operations such as SU-MIMO operations and MU-MIMO operations. The AP 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 360(1)-360(n), and may be used to process signals received from one or more of the antennas 360(1)-360(n) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and may also store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the AP 300 (such as within the memory 340). In some implementations, the processor 330 may be or include one or more microprocessors providing the processor functionality and external memory providing at least a portion of machine-readable media. In other implementations, the processor 330 may be or include an Application Specific Integrated Circuit (ASIC) with the processor, the bus interface, the user interface, and at least a portion of the machine-readable media integrated into a single chip. In some other implementations, the processor 330 may be or include one or more Field Programmable Gate Arrays (FPGAs) or Programmable Logic Devices (PLDs).

The memory 340 may include a device database 341 that stores profile information for a plurality of STAs. The profile information for a particular STA may include, for example, its MAC address, supported data rates, connection history with the AP 300, one or more RUs allocated to the STA, the BSS with which the STA is associated or to which the STA belongs, and any other suitable information pertaining to or describing the operation of the STA.

The memory 340 may also include a non-transitory computer-readable medium (such as one or more nonvolatile memory elements, such as EPROM, EEPROM, Flash memory, a hard drive, and so on) that may store computer-executable instructions 342 to perform all or a portion of one or more operations described in this disclosure.

The processor 330 may be one or more suitable processors capable of executing scripts or instructions of one or more software programs (such as instructions 342) stored within the memory 340. In some implementations, the processor 330 may be one or more general purpose processors that execute the instructions 342 to cause the AP 300 to perform any number of different functions or operations such as, for example, one or more operations of FIGS. 8, 9, 10A, 10B, 10C, 11A, 11B, 11C, 12, 13A, 13B, 13C, 14, 15, 16A, and 16B. In additional or alternative aspects, the processor 330 may include integrated circuits or other hardware to perform functions or operations without the use of software. While shown to be coupled to each other via the processor 330 in the example of FIG. 3, the processor 330, the memory 340, the network interface 350, and the MAC 320 may be coupled to one another in various arrangements. For example, the processor 330, the memory 340, the network interface 350, and the MAC 320 may be coupled to each other via one or more local buses (not shown for simplicity).

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

An AP may allocate specific or dedicated RUs to a number of associated STAs using a trigger frame. In some implementations, the trigger frame may identify a number of STAs associated with the AP, and may solicit uplink (UL) multi-user (MU) data transmissions from the identified STAs using their allocated RUs. The trigger frame may use association identification (AID) values, assigned by the AP to its associated STAs, to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU.

Figure 4:
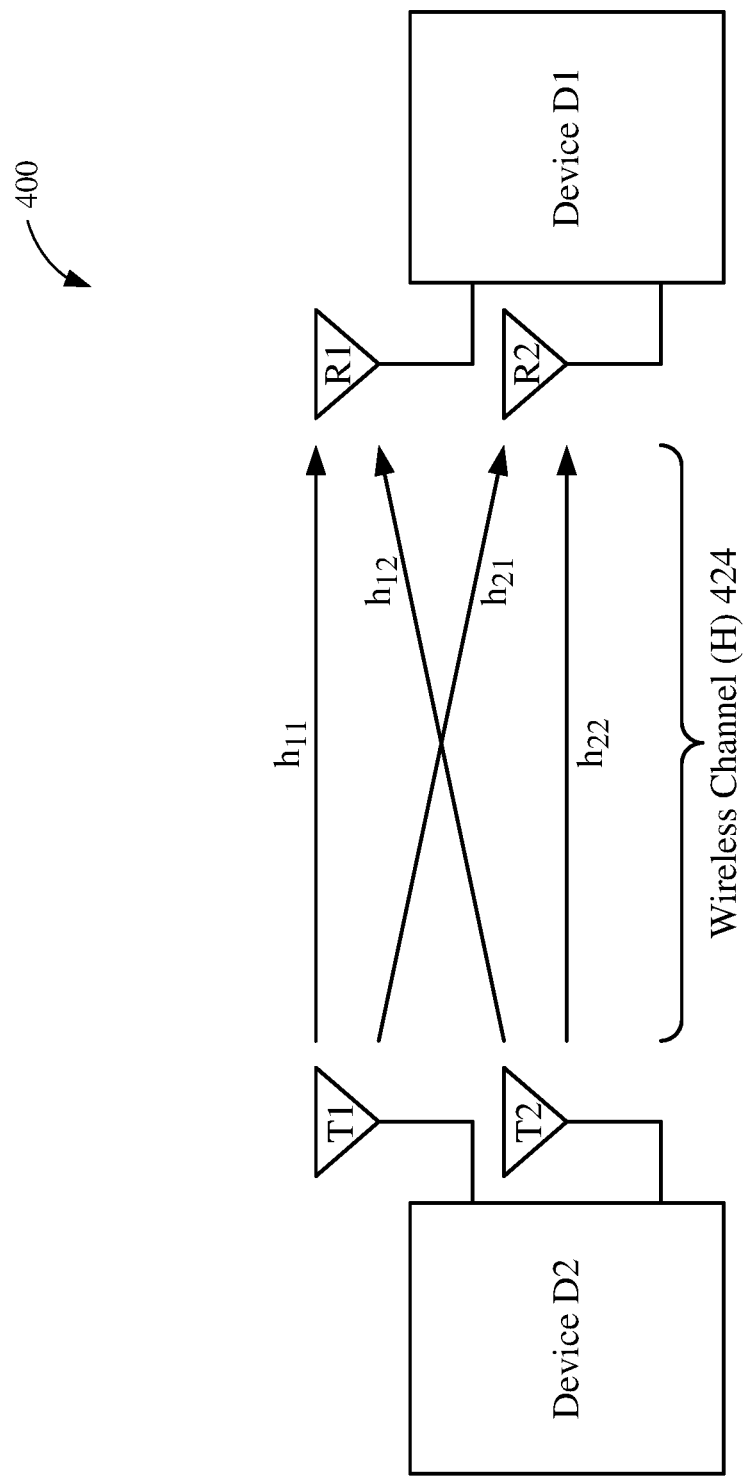
FIG. 4 is an illustration depicting a first wireless device estimating channel conditions for frames received from a second wireless device.

FIG. 4 is an illustration 400 depicting a first wireless device D1 estimating channel conditions for frames received from a second wireless device D2. For the example of FIG. 4, device D1 includes two receive antennas R1-R2, and device D2 includes two transmit antennas T1-T2. The wireless channel 425, as perceived by device D1, may be modeled as a 2×2 channel matrix H:

$$H = \begin{bmatrix} h_{11} & h_{12} \\ h_{21} & h_{22} \end{bmatrix}$$

Device D2 may transmit frames via antennas T1-T2 as two spatial streams on the wireless channel 425. Device D1 may receive the frames via antennas R1 and R2. In some implementations, the first antenna R1 receives the frames on a first spatial link modeled by $h_{11}$ and on a second spatial link modeled by $h_{12}$, and the second antenna R2 receives the frames on a third spatial link modeled by $h_{21}$ and on a fourth spatial link modeled by $h_{22}$. Although described as a 2×2 channel for simplicity, the wireless channel 425 may be modeled as an M×N channel matrix H for any number (M)

of transmit antennas and N receive antennas in a manner known to those skilled in the art.

Referring to FIG. 1, the APs 110-115 may be synchronized with each other, for example, so that the antennas of all the APs 110-115 may operate as a single antenna array when transmitting beamformed data to the STA. The phases of the carrier signals of the APs 110-115 may be stable relative to each other, which may be used to determine the frequency offset and jitters in relative timing offsets than can be tolerated between the APs 110-115. For example, assume that 60 degrees of phase error relative to the ideal or target phase can be tolerated and that phase synchronization signals are transmitted to the APs 110-115 every 5 milliseconds (ms). The amount of frequency error which rotates to 60 degrees of phase error during a time period of 5 ms is 33.33 Hz. Thus, approximately 30 Hz of phase error relative to the ideal or target frequency may be tolerated at the APs 110-115, which translates to approximately 60 Hz of phase error across the different APs 110-115. In other words, if the APs 110-115 are within 60 Hz of each other, then the APs 110-115 may be synchronized every 5 ms. For another example, if the APs 110-115 are within 300 Hz of each other, then the APs 110-115 may be synchronized every 1 ms (such as because the phase error may grow faster when the APs 110-115 are within 300 Hz of each other than when the APs 110-115 are within 60 Hz of each other). For another example, if the APs 110-115 are within 1 Hz of each other, then the APs 110-115 may not need to be synchronized, for example, because it will take a relatively long time (such as a time period greater than a TXOP) for the 1 Hz phase error to increase to a point that affects the beamforming gain.

The amount of timing offset which rotates to 120 degrees of phase error in an 80 MHz channel is 8 ns. Thus, a relative timing offset stability of approximately 8 ns across the APs 110-115 may be needed between the time that channel conditions are estimated and the time that the APs 110-115 transmit DL data to the STA. The relative timing offset stability indicates the amount of timing jitter it usually takes for the phase ramp in frequency (such as because a relative timing jitter causes a phase ramp in frequency) to cause a phase offset across the APs 110-115 on some tones to reach an unacceptable level. In some implementations, the APs 110-115 may be synchronized with each other before their relative phase offsets become large enough to degrade beamforming gain (such as below a level).

In some implementations, phase synchronization between the APs 110-115 may include a large-scale ppm error and a short-term phase stability. The large-scale ppm error may correspond to the frequency offset of an AP's carrier signal from a target carrier frequency. The IEEE 802.11ac and 802.11ax protocols may specify a pre-correction range of +/−20 ppm for the carrier frequency of a transmitting device relative to the target carrier frequency. In some implementations (such as in trigger-based transmissions specified in the IEEE 802.11ax standards), post correction may be used to ensure that each STA that has a relatively high level of SNR can maintain its transmit clock frequency within 350 Hz of an AP's transmit carrier frequency.

Figure 5:
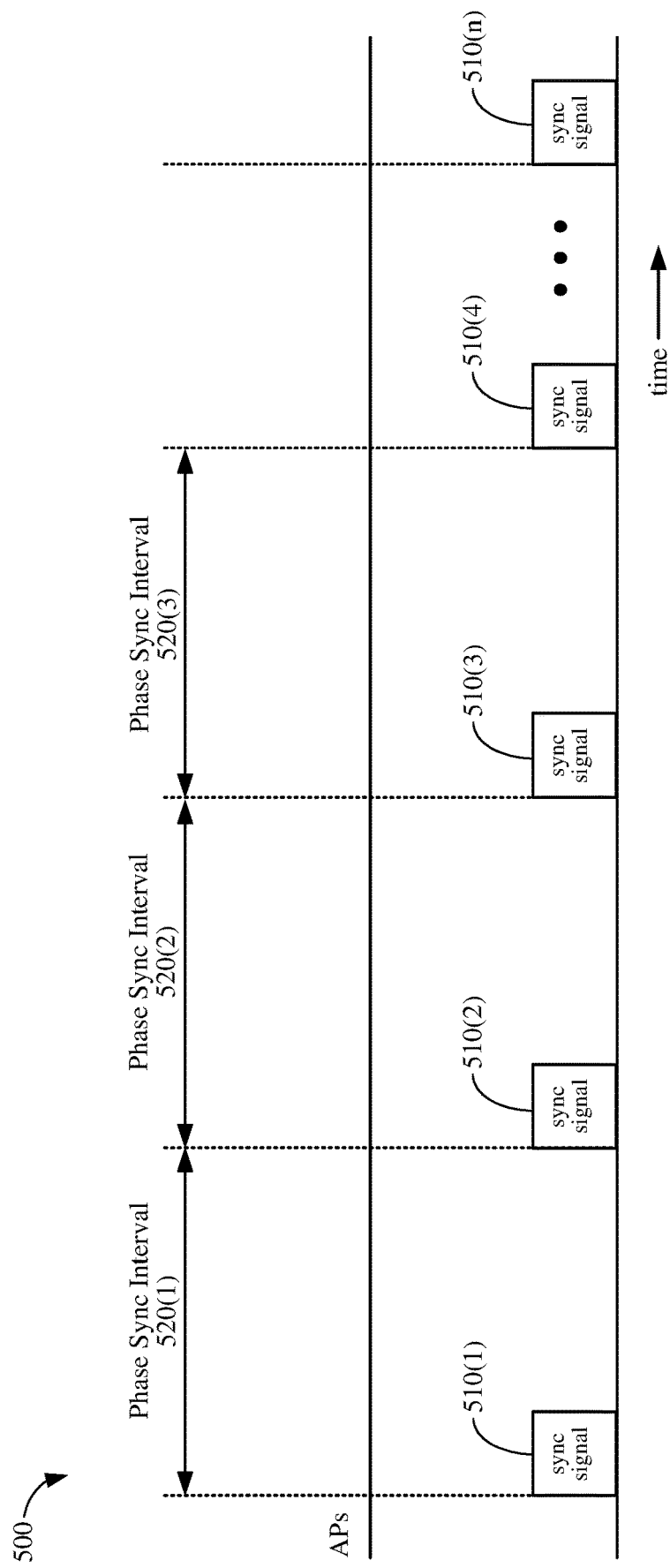
FIG. 5 is a timing diagram depicting an example operation for transmitting phase synchronization signals to a plurality of access points (APs).

The short-term phase stability may refer to the amount of phase variation during an interval between the transmission of consecutive phase synchronization signals to the APs 110-115. For example, FIG. 5 is a timing diagram depicting an example operation 500 for transmitting a series of phase synchronization signals 510(1)-510(n) to a plurality of APs. In some implementations, a central controller or master AP may transmit the phase synchronization signals 510(1)-510(n). In other implementations, the phase synchronization signals 510(1)-510(n) may be based on periodic feedback provided by the STA. Transmissions of adjacent phase synchronization signals 510(1)-510(n) are separated in time by a corresponding phase sync interval 520, for example, where the transmission of phase synchronization signals 510(1) and 510(2) are separated by a first phase sync interval 520(1), the transmission of phase synchronization signals 510(2) and 510(3) are separated by a second phase sync interval 520(2), the transmission of phase synchronization signals 510(3) and 510(4) are separated by a third phase sync interval 520(3), and so on. In some implementations, phase offset variations may be limited to less than 60 degrees during each of the phase sync intervals 520(1)-520(3).

The duration of each of the phase sync intervals 520(1)-520(3), and thus the frequency with which the phase synchronization signals 510(1)-510(n) are transmitted to the APs participating in the transmission of beamformed data to the STA, may be based on the stability of the crystal oscillators used to generate the carrier signals of the APs. In some implementations, the duration of the phase sync intervals 520(1)-520(3) may be based on the amount of phase offset variation that can be tolerated between the APs (such as without reducing beamforming gain more than an amount). For one example, the frequencies of the carrier signals used by the APs may be within 60 Hz of each other (12 ppb) to perform phase correction every 5 ms. For another example, the frequencies of the carrier signals used by the APs may be within 300 Hz (60 ppb) to perform phase correction every 1 ms.

Figure 6A:
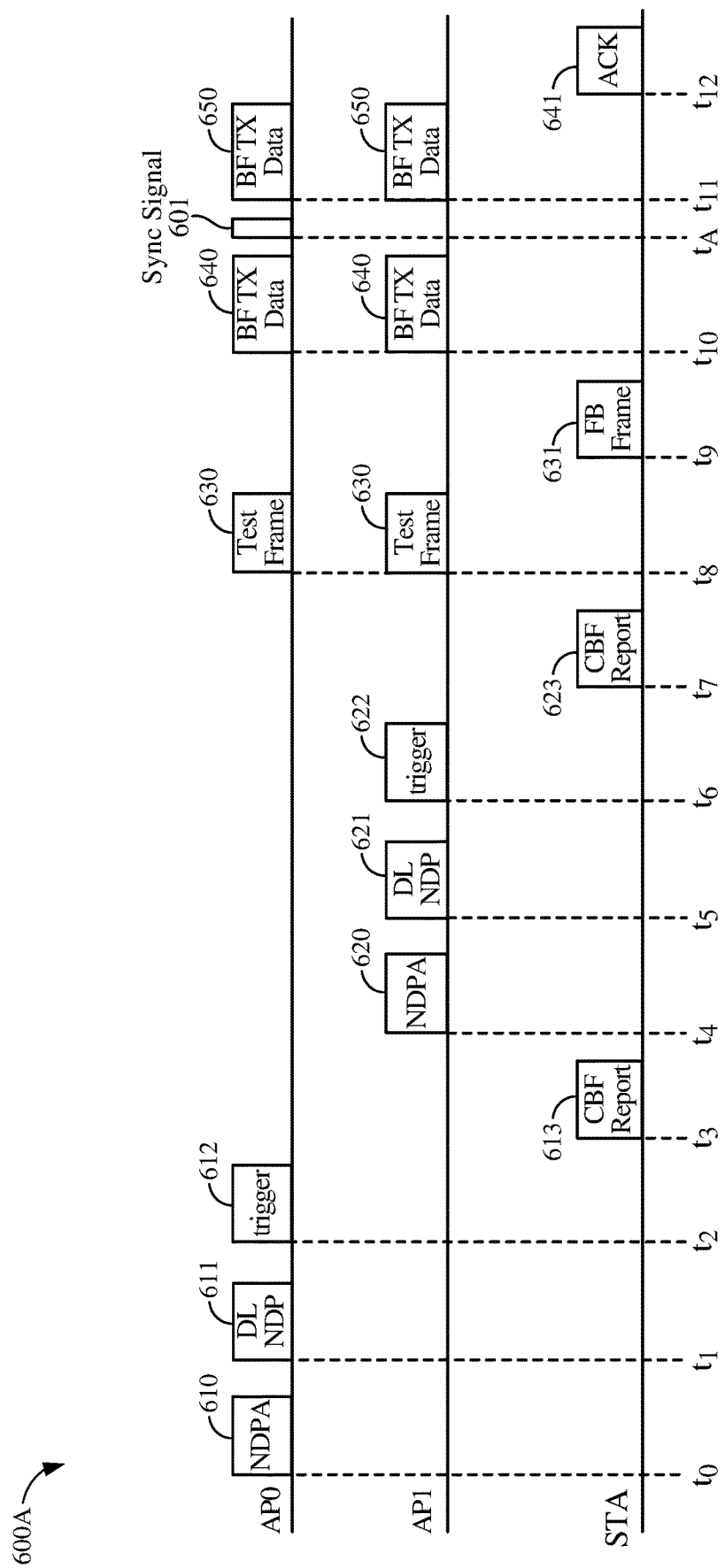
FIG. 6A is a timing diagram depicting an example sounding operation.

FIG. 6A is a timing diagram depicting an example sounding operation 600A. In some implementations, the example sounding operation 600A may be used to determine beamforming steering matrices for a plurality of APs (such as the APs 110-115 of FIG. 1) configured to operate as a distributed antenna array. Although only two access points AP0 and AP1 are shown in FIG. 6A for simplicity, the example sounding operation 600A may be used to determine beamforming steering matrices for any suitable number of APs (or other suitable wireless devices).

At time $t_0$, AP0 transmits a null data packet announcement (NDPA) 610 to the STA. The NDPA 610 may indicate a number of spatial streams allocated to the STA, may announce that AP0 is to transmit an NDP, may indicate that the STA is to respond to the NDP, or any combination thereof. In some implementations, the NDPA 610 may include a plurality of long training fields (LTFs) from which the STA can estimate a frequency of AP0's carrier signal, and then provide correction information to AP0 indicating a frequency offset between the carrier frequency of AP0 and a target carrier frequency. In some implementations, the NDPA 610 may be used by AP1 to estimate the carrier frequency of AP0, which in turn may allow AP1 to align its carrier frequency with the estimated carrier frequency of AP0. Referring also to FIG. 1, each of the non-transmitting APs 110-115 in the wireless network 100 may use the NDPA 610 to estimate the carrier frequency of the transmitting AP and then align its carrier frequency with the estimated carrier frequency of the transmitting AP. In some implementations, the LTFs may be contained in the preamble of the NDPA 610. In addition, the NDPA 610 may also indicate a number of resource units (RUs) allocated to the STA.

At time $t_1$, AP0 transmits a DL null data packet (NDP) 611 to the STA. The DL NDP 611 may include one or more sounding sequences from which the STA can estimate the channel between AP0 and the STA. The sounding sequences may be any suitable sequence or pattern that is known to the STA. In some implementations, the sounding sequences contained in the DL NDP 611 may be high-efficiency long training fields (HE-LTFs), very high-throughput long training fields (VHT-LTFs), high-throughput long training fields (HT-LTFs), or legacy LTFs. In addition, or in the alternative, the sounding sequences may be orthogonal to each other, for example, so that the STA can distinguish between sounding sequences transmitted from different antennas of AP0.

In some implementations, AP0 may transmit an optional trigger frame 612 to the STA at time $t_2$. The trigger frame 612 may be used by AP0 to solicit compressed beamforming (CBF) reports from multiple STAs at the same time, based on the same NDP. In other implementations, AP0 may not transmit the optional trigger frame 612 to the STA. For example, the transmission of the DL NDP 611 may serve as an implicit trigger to cause the STAs to respond with CBF reports.

The STA receives the DL NDP 611 from AP0, and may estimate channel conditions based on the sounding sequences contained in the DL NDP 611. At time $t_3$, the STA may transmit a compressed beamforming (CBF) report 613 to AP0. The CBF report 613 may include a beamforming feedback matrix based on channel conditions estimated by the STA. AP0 may receive the CBF report 613, and may use the beamforming feedback matrix contained in the CBF report 613 to generate the beamforming steering matrix.

At time $t_4$, AP1 transmits an NDPA 620 to the STA. The NDPA 620 may indicate a number of spatial streams allocated to the STA, may announce that AP1 is to transmit an NDP, may indicate that the STA is to respond to the NDP, or any combination thereof. In some implementations, the NDPA 620 may include LTFs from which the STA can estimate a frequency of AP1's carrier signal, and then provide correction information to AP1 indicating a frequency offset between the carrier frequency of AP1 and a target carrier frequency. In some implementations, the NDPA 620 may be used by AP0 to estimate the carrier frequency of AP1, which in turn may allow AP0 to align its carrier frequency with the estimated carrier frequency of AP1. Referring also to FIG. 1, any of the non-transmitting APs 110-115 in the wireless network 100 may use the NDPA 620 to estimate the carrier frequency of the transmitting AP and then align its carrier frequency with the estimated carrier frequency of the transmitting AP. In some implementations, the LTFs may be contained in the preamble of the NDPA 620. In addition, the NDPA 620 may also indicate a number of resource units (RUs) allocated to the STA.

At time $t_5$, AP1 transmits a DL NDP 621 to the STA. The DL NDP 621 may include a plurality of sounding sequences from which the STA can estimate the channel between AP1 and the STA. The sounding sequences may be any suitable sequence or pattern that is known to the STA. For example, the sounding sequences contained in the DL NDP 621 may be HE-LTFs, VHT-LTFs, HT-LTFs, or legacy LTFs. In some implementations, the sounding sequences may be orthogonal to each other, for example, so that the STA can distinguish between sounding sequences transmitted from different antennas of AP1.

In some implementations, AP1 may transmit an optional trigger frame 622 to the STA at time $t_6$. The trigger frame 622 may be used by AP1 to solicit CBF reports from multiple STAs at the same time, based on the same NDP. In other implementations, AP1 may not transmit the optional trigger frame 622 to the STA. For example, the transmission of the DL NDP 621 may serve as an implicit trigger to cause the STAs to respond with CBF reports.

The STA receives the DL NDP 621 from AP1, and may estimate channel conditions based on the sounding sequences contained in the DL NDP 621. At time $t_7$, the STA may transmit a CBF report 623 to AP1. The CBF report 623 may include a beamforming feedback matrix based on channel conditions estimated by the STA. AP1 may receive the CBF report 623, and may use the beamforming feedback matrix contained in the CBF report 623 to generate the beamforming steering matrix.

At time $t_8$, AP0 and AP1 simultaneously transmit a beamformed test frame 630 to the STA. In some implementations, AP0 and AP1 simultaneously transmit the test frame 630 as beamformed spatial streams using their respective generated beamforming steering matrices. The STA receives the beamformed test frame 630, and may estimate phase differences between beamformed channels across AP0 and AP1 based on the beamformed test frame 630. At time $t_9$, the STA may transmit a feedback frame 631 to AP0 and AP1. The feedback frame 631 may include one or more correction factors indicating estimated phase differences between beamformed channels across AP0 and AP1. In some implementations, AP0 and AP1 may adjust their corresponding beamforming steering matrices based on the correction factor(s) provided by the STA.

At time $t_{10}$, AP0 and AP1 simultaneously transmit beamformed data 640 to the STA based on their corresponding beamforming steering matrices (such as by transmitting a number of first beamformed data frames at time $t_{10}$). In some implementations, AP0 and AP1 simultaneously transmit the beamformed data 640 to the STA as beamformed spatial streams using their adjusted beamforming steering matrices. In some aspects, AP0 may transmit a phase synchronization signal 601 at time $t_4$. The phase synchronization signal 601 may provide phase synchronization data to AP1 (and to any other APs that operate with AP0 and AP1 as a distributed antenna array). Although not shown in FIG. 6A for simplicity, in other implementations, the STA (rather than AP0) may transmit the phase synchronization signal 601 at time $t_4$. At time $t_{11}$, AP0 and AP1 may simultaneously transmit additional beamformed data to the STA based on their corresponding beamforming steering matrices and based on the phase synchronization signal 601 (such as by transmitting a number of second beamformed data frames 650 at time $t_{11}$).

At time $t_{12}$, the STA may transmit an acknowledgement (ACK) frame 641 to AP0 and AP1, for example, to acknowledge reception of the beamformed data 640 transmitted from AP0 and AP1 at time $t_{10}$, and in instances in which second beamformed data frames were transmitted at time $t_{11}$, to acknowledge reception of the beamformed data 650 transmitted from AP0 and AP1 at time $t_{11}$.

Figure 6B:
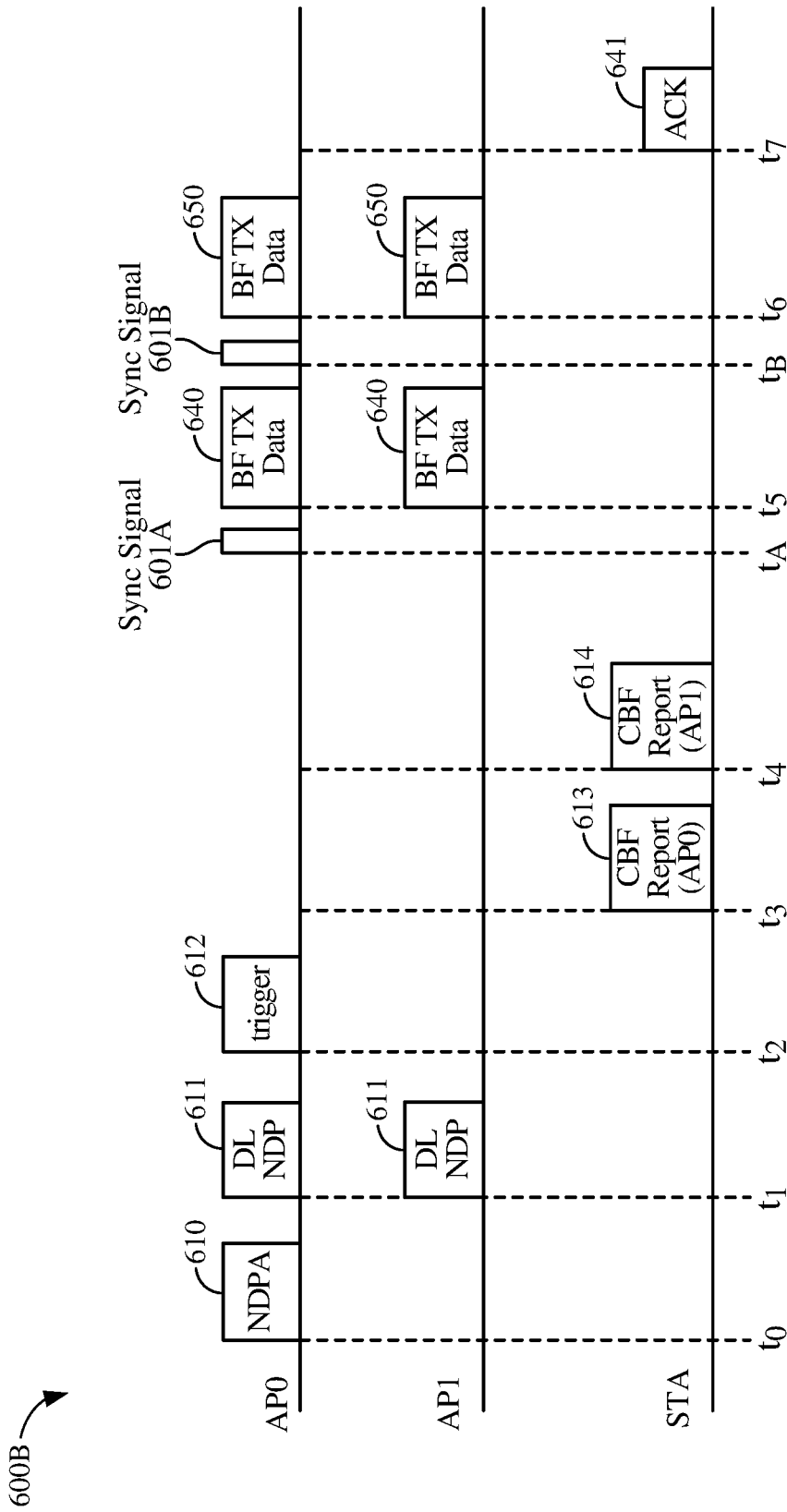
FIG. 6B is a timing diagram depicting another example sounding operation.

FIG. 6B is a timing diagram depicting another example sounding operation 600B. In some implementations, the example sounding operation 600B may be used to determine beamforming steering matrices for a plurality of APs (such as the APs 110-115 of FIG. 1) configured to operate as a distributed antenna array. Although only two access points AP0 and AP1 are shown in FIG. 6B for simplicity, the example sounding operation 600B may be used to determine beamforming steering matrices for any suitable number of APs.

At time $t_0$, AP0 transmits a NDPA 610 to the STA. The NDPA 610 may indicate a number of spatial streams allocated to the STA. The NDPA 610 may also announce that each of AP0 and AP1 is to transmit an NDP, and may indicate that the STA is to respond to the NDPs received from AP0 and AP1. In some implementations, the NDPA 610 may include a plurality of LTFs from which the STA can estimate a frequency of AP0's carrier signal, and then provide correction information to AP0 indicating a frequency offset between the carrier frequency of AP0 and a target carrier frequency. In some implementations, the NDPA 610 may be used by AP1 to estimate the frequency of AP0, which in turn may allow AP1 to align its frequency with the estimated frequency AP0. Referring also to FIG. 1, any of the non-transmitting APs 110-115 in the wireless network 100 may use the NDPA 610 to estimate the frequency of the transmitting AP and then align its frequency with the estimated frequency of the transmitting AP. In some implementations, the LTFs may be contained in the preamble of the NDPA 610. In some implementations, the NDPA 610 may also indicate a number of resource units (RUs) allocated to the STA.

At time $t_1$, each of AP0 and AP1 simultaneously transmits a DL NDP 611 to the STA. The DL NDPs 611 may each include a plurality of sounding sequences from which the STA can estimate the channels between the STA and each of AP0 and AP1. The sounding sequences may be any suitable sequence or pattern that is known to the STA. For example, the sounding sequences contained in the DL NDP 611 may be HE-LTFs, VHT-LTFs, HT-LTFs, or legacy LTFs. In some implementations, the sounding sequences may be orthogonal to each other, for example, so that the STA can distinguish between sounding sequences transmitted from different antennas of AP0 and AP1.

In some implementations, AP0 may transmit an optional trigger frame 612 to the STA at time $t_2$. The trigger frame 612 may be used by AP0 to solicit CBF reports from multiple STAs at the same time, based on the same NDP. In other implementations, AP0 may not transmit the optional trigger frame 612 to the STA. For example, the transmissions of the DL NDPs 611 may serve as implicit triggers to cause the STAs to respond with CBF reports.

The STA receives the DL NDPs 611 from AP0 and AP1, and may estimate channel conditions based on the sounding sequences contained in the DL NDPs 611. The STA may transmit a first CBF report 613 to AP0 at time $t_3$, and may transmit a second CBF report 614 to AP0 at time $t_4$. The first CBF report 613 may include a beamforming feedback matrix based on the estimated channel between AP0 and the STA, and the second CBF report 614 may include a beamforming feedback matrix based on the estimated channel between AP1 and the STA. AP0 may receive the first CBF report 613, and may use the beamforming feedback matrix contained in the first CBF report 613 to generate the beamforming steering matrix. AP1 may receive the second CBF report 614, and may use the beamforming feedback matrix contained in the second CBF report 614 to generate the beamforming steering matrix.

At time $t_5$, AP0 and AP1 simultaneously transmit beamformed data 640 to the STA based on their corresponding beamforming steering matrices (such as by transmitting a number of first beamformed data frames at time $t_5$). In some implementations, AP0 and AP1 simultaneously transmit the beamformed data 640 to the STA as beamformed spatial streams using their adjusted beamforming steering matrices. In some aspects, AP0 may transmit a first phase synchronization signal 601A at time $t_A$, and may transmit a second phase synchronization signal 601B at time $t_B$ (such as after the transmission of the beamformed data 640 to the STA at time $t_5$). The phase synchronization signals 601A and 601B may provide phase synchronization data to AP1 (and to any other APs that operate with AP0 and AP1 as a distributed antenna array). Although not shown in FIG. 6B for simplicity, in other implementations, the STA (rather than AP0) may transmit the phase synchronization signals 601A and 601B at times $t_A$ and $t_B$, respectively. At time $t_6$, AP0 and AP1 may simultaneously transmit additional beamformed data to the STA based on their corresponding beamforming steering matrices and based on the phase synchronization signal (such as by transmitting a number of second beamformed data frames 650 at time $t_6$).

At time $t_7$, the STA may transmit an ACK frame 641 to AP0 and AP1, for example, to acknowledge reception of the beamformed data 640 transmitted from AP0 and AP1 at time $t_5$, and in instances in which second beamformed data frames were transmitted, to acknowledge reception of the beamformed data 650 transmitted from AP0 and AP1 at time $t_6$.

Figure 6C:
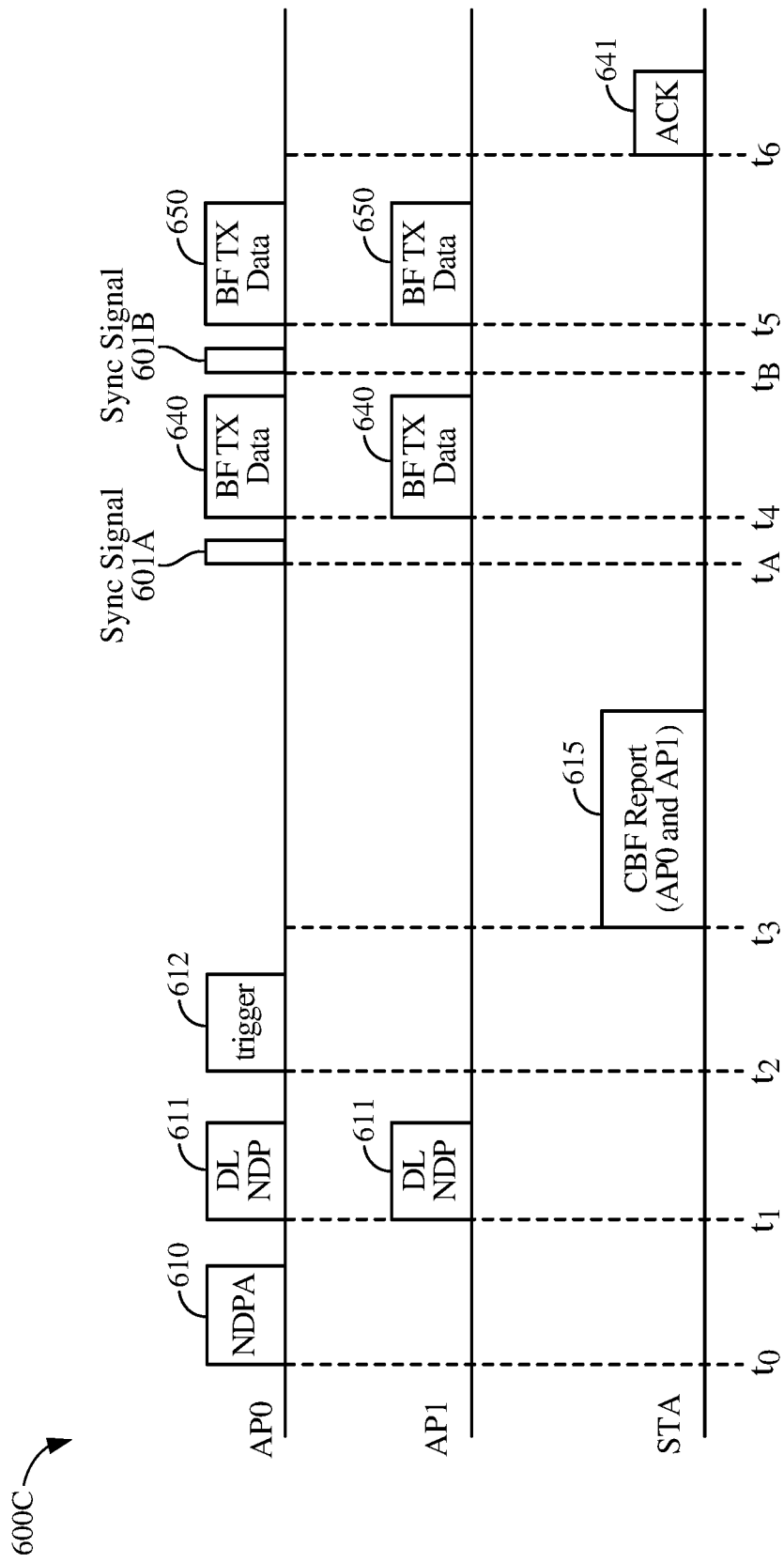
FIG. 6C is a timing diagram depicting another example sounding operation.

FIG. 6C is a timing diagram depicting another example sounding operation 600C. In some implementations, the example sounding operation 600C may be used to determine beamforming steering matrices for a plurality of APs (such as the APs 110-115 of FIG. 1) configured to operate as a distributed antenna array. Although only two access points AP0 and AP1 are shown in FIG. 6C for simplicity, the example sounding operation 600C may be used to determine beamforming steering matrices for any suitable number of APs. The example sounding operation 600C is similar to the example sounding operation 600B of FIG. 6B, except that the STA transmits the first and second CBF reports 613 and 614 as a single PPDU 615 (rather than transmitting the first and second CBF reports 613 and 614 as a separate PPDUs in the example sounding operation 600B of FIG. 6B). Although FIG. 6C depicts AP0 as transmitting the phase synchronization signals 601A and 601B at times $t_A$ and $t_B$, in other implementations, the STA (rather than AP0) may transmit the phase synchronization signals 601A and 601B.

Figure 6D:
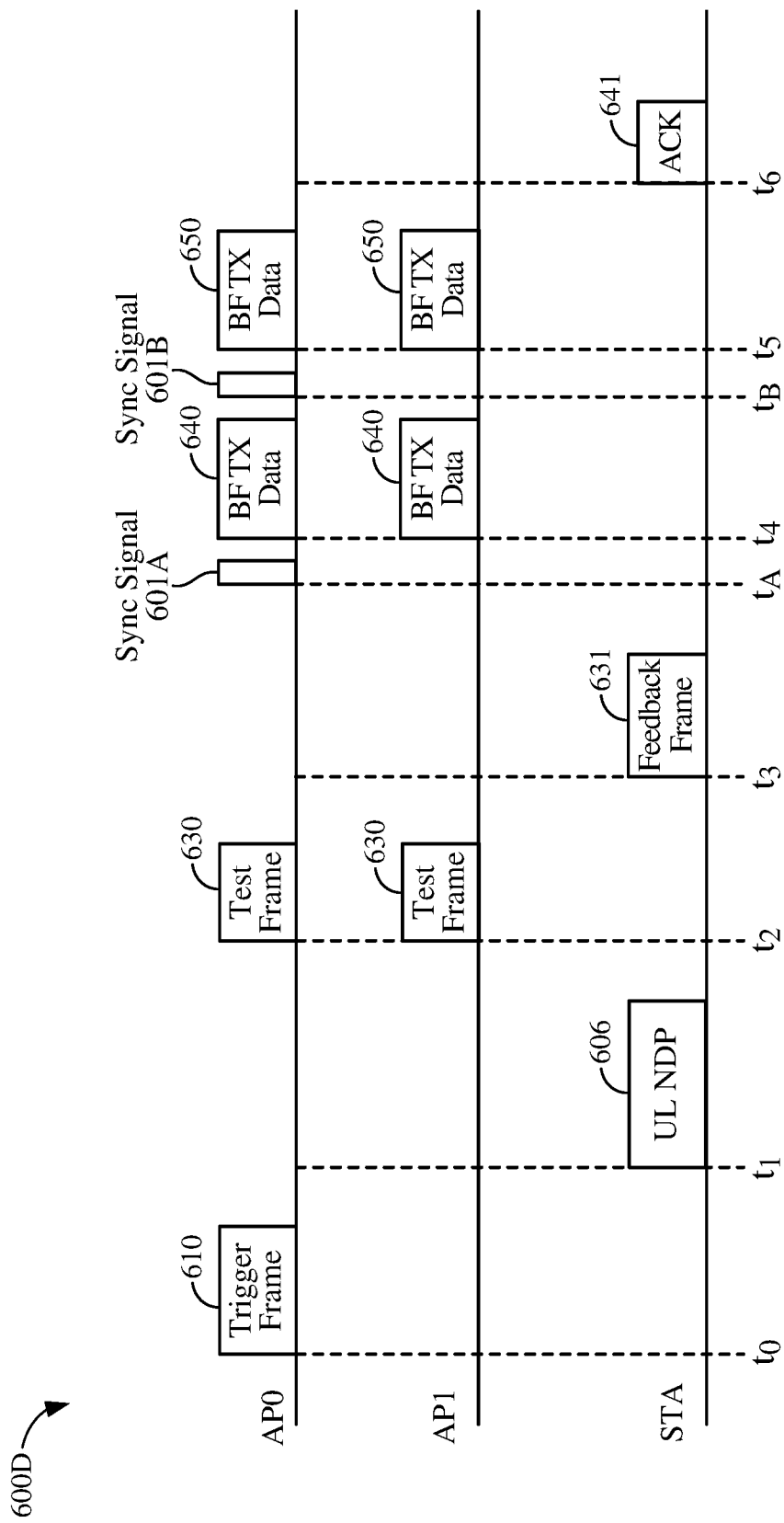
FIG. 6D is a timing diagram depicting another example sounding operation.

FIG. 6D is a timing diagram depicting another example sounding operation 600D. In some implementations, the example sounding operation 600D may be used to determine beamforming steering matrices for a plurality of APs (such as the APs 110-115 of FIG. 1) configured to operate as a distributed antenna array. Although only two access points AP0 and AP1 are shown in FIG. 6D for simplicity, the example sounding operation 600D may be used to determine beamforming steering matrices for any suitable number of APs.

At time $t_0$, AP0 transmits a trigger frame 605 to the STA. The trigger frame 605 may solicit the STA to transmit an UL NDP to AP0 and AP1. The trigger frame 605 may also indicate a number of spatial streams and a number of resource units (RUs) allocated to the STA. The STA receives the trigger frame 605, and transmits an UL NDP 606 at time $t_1$. The UL NDP 606 may include a plurality of sounding sequences from which AP0 can estimate the channel between AP0 and the STA and from which AP1 can estimate the channel between AP1 and the STA. The sounding sequences may be any suitable sequence or pattern that is known to AP0 and AP1. For example, the sounding sequences contained in the UL NDP 606 may be high-efficiency HE-LTFs, VHT-LTFs, HT-LTFs, or legacy LTFs. In some implementations, the sounding sequences may be orthogonal to each other, for example, so that AP0 and AP1 can distinguish between sounding sequences transmitted from different antennas of the STA.

AP0 receives the UL NDP 606 from the STA, and may estimate UL channel conditions based on the sounding sequences contained in the UL NDP 606. AP0 may also determine DL channel conditions based on the estimated UL channel conditions and a calibration factor. Similarly, AP1 receives the UL NDP 606 from the STA, and may estimate UL channel conditions based on the sounding sequences contained in the UL NDP 606. AP1 may also determine DL channel conditions based on the estimated UL channel conditions and a calibration factor. It is noted that the channel conditions estimated by AP0 correspond to a channel between AP0 and the STA, and that the channel conditions estimated by AP1 correspond to a channel between AP1 and the STA. In some implementations, there may be phase differences between the carrier signals associated with the APs, for example, resulting from one or more of different singular-value decompositions (SVDs) between the APs, phase offsets between transmit chains of the APs, or frequency offsets between transmit chains of the APs.

AP0 and AP1 may align the phases of their beamformed signals because phase differences between AP0 and AP1 may exist even after adjusting their phases based on the individually determined DL channel information. In some implementations, STA-assisted phase alignment operations are performed prior to the transmission of beamformed signals from the APs to the STA.

At time $t_2$, AP0 and AP1 simultaneously transmit a beamformed test frame 630 to the STA. In some implementations, AP0 and AP1 simultaneously transmit the test frame 630 as beamformed spatial streams using beamforming steering matrices generated based on the estimated DL channel conditions. The STA receives the beamformed test frame 630, and may estimate phase differences between beamformed channels across AP0 and AP1 based on the test frame 630. At time $t_3$, the STA may transmit a feedback frame 631 to AP0 and AP1. The feedback frame 631 may include one or more correction factors indicating estimated phase differences between beamformed channels across AP0 and AP1. In some implementations, AP0 and AP1 may adjust their corresponding beamforming steering matrices based on the correction factor(s) provided by the STA.

At time $t_4$, AP0 and AP1 simultaneously transmit beamformed data 640 to the STA based on their corresponding beamforming steering matrices (such as by transmitting a number of first beamformed data frames at time $t_4$). In some implementations, AP0 and AP1 simultaneously transmit the beamformed data 640 to the STA as beamformed spatial streams using their adjusted beamforming steering matrices. In some aspects, AP0 may transmit a first phase synchronization signal 601A at time $t_A$, and may transmit a second phase synchronization signal 601B at time $t_B$ (such as after the transmission of the beamformed data 640 to the STA at time $t_4$). The phase synchronization signals 601A and 601B may provide phase synchronization data to AP1 (and to any other APs that operate with AP0 and AP1 as a distributed antenna array). In other aspects, the STA may transmit the first and second phase synchronization signals 601A and 601B to AP0 and AP1. Although not shown in FIG. 6D for simplicity, in other implementations, the STA (rather than AP0) may transmit the phase synchronization signals 601A and 601B at times $t_A$ and $t_B$, respectively. At time $t_5$, AP0 and AP1 may simultaneously transmit additional beamformed data to the STA based on their corresponding beamforming steering matrices and based on the phase synchronization signal (such as by transmitting a number of second beamformed data frames 650 at time $t_5$).

At time $t_6$, the STA may transmit an ACK frame 641 to AP0 and AP1, for example, to acknowledge reception of the beamformed data 640 transmitted from AP0 and AP1 at time $t_4$, and in instances in which second beamformed data frames were transmitted, to acknowledge reception of the beamformed data 650 transmitted from AP0 and AP1 at time $t_5$.

Figure 6E:
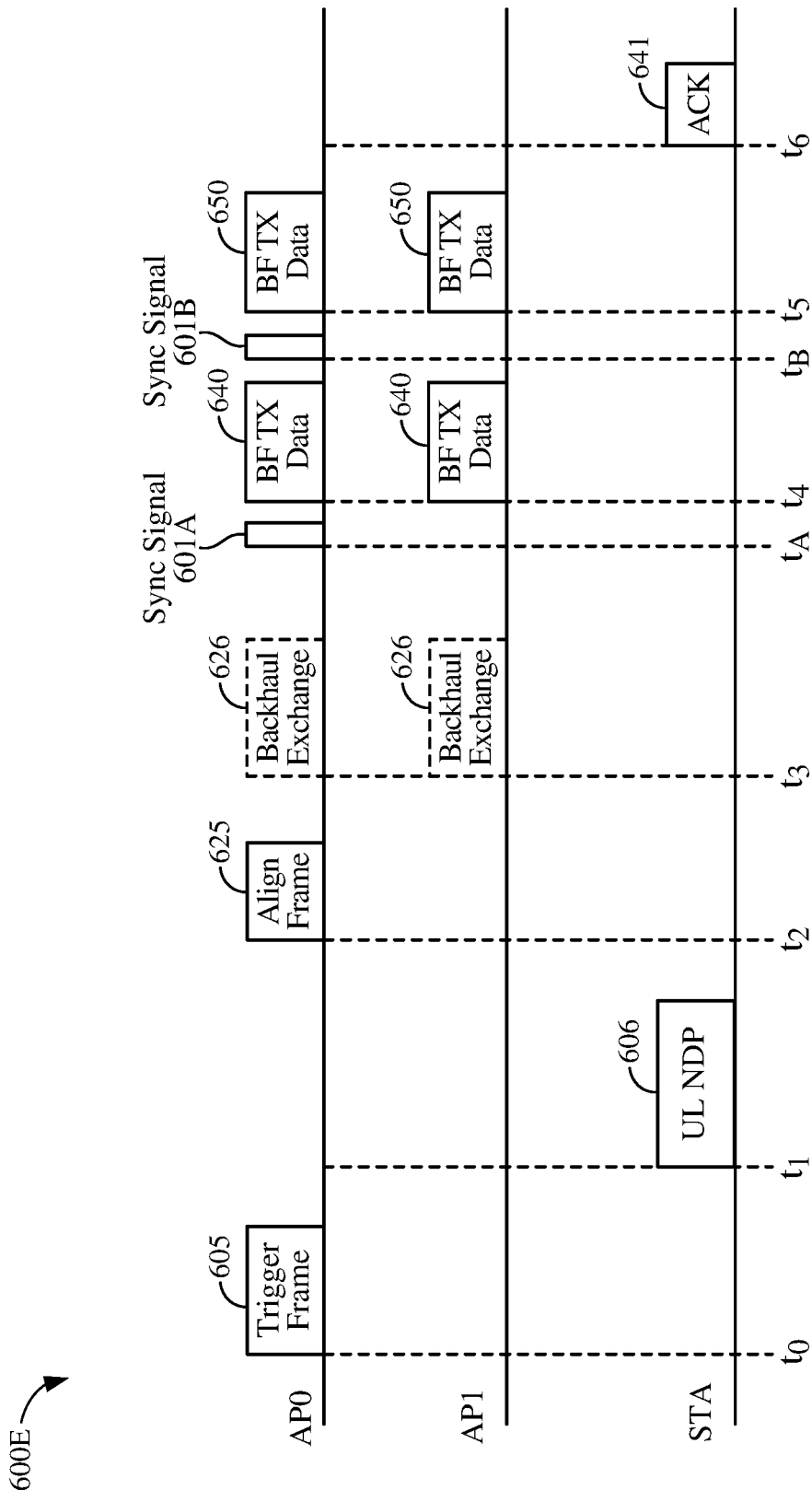
FIG. 6E is a timing diagram depicting another example sounding operation.

FIG. 6E is a timing diagram depicting another example sounding operation 600E. In some implementations, the example sounding operation 600E may be used to determine beamforming steering matrices for a plurality of APs (such as the APs 110-115 of FIG. 1) configured to operate as a distributed antenna array. Although only two access points AP0 and AP1 are shown in FIG. 6E for simplicity, the example sounding operation 600E may be used to determine beamforming steering matrices for any suitable number of APs. The example sounding operation 600E is similar to the example sounding operation 600D of FIG. 6D, except that AP0 and AP1 do not transmit test frames in example sounding operation 600E of FIG. 6E. Instead, AP0 transmits a phase alignment frame 625 at time $t_2$. The phase alignment frame 625 may be used to synchronize phases across of the APs. In some implementations, AP0 and AP1 may exchange channel information 626 using the backhaul network. The backhaul exchange of individual channel information may be used to concurrently determine pre-coded data to be simultaneously transmitted from all of the APs (such as AP0-AP1 in FIG. 600E or APs 110-115 in FIG. 1) prior to aligning the phases of the APs with each other. In addition, or in the alternative, the pre-coded data may be provided to a central controller. Further, although FIG. 6E depicts AP0 as transmitting the phase synchronization signals 601A and 601B at times to and $t_B$, in other implementations, the STA (rather than AP0) may transmit the phase synchronization signals 601A and 601B.

Figure 7:
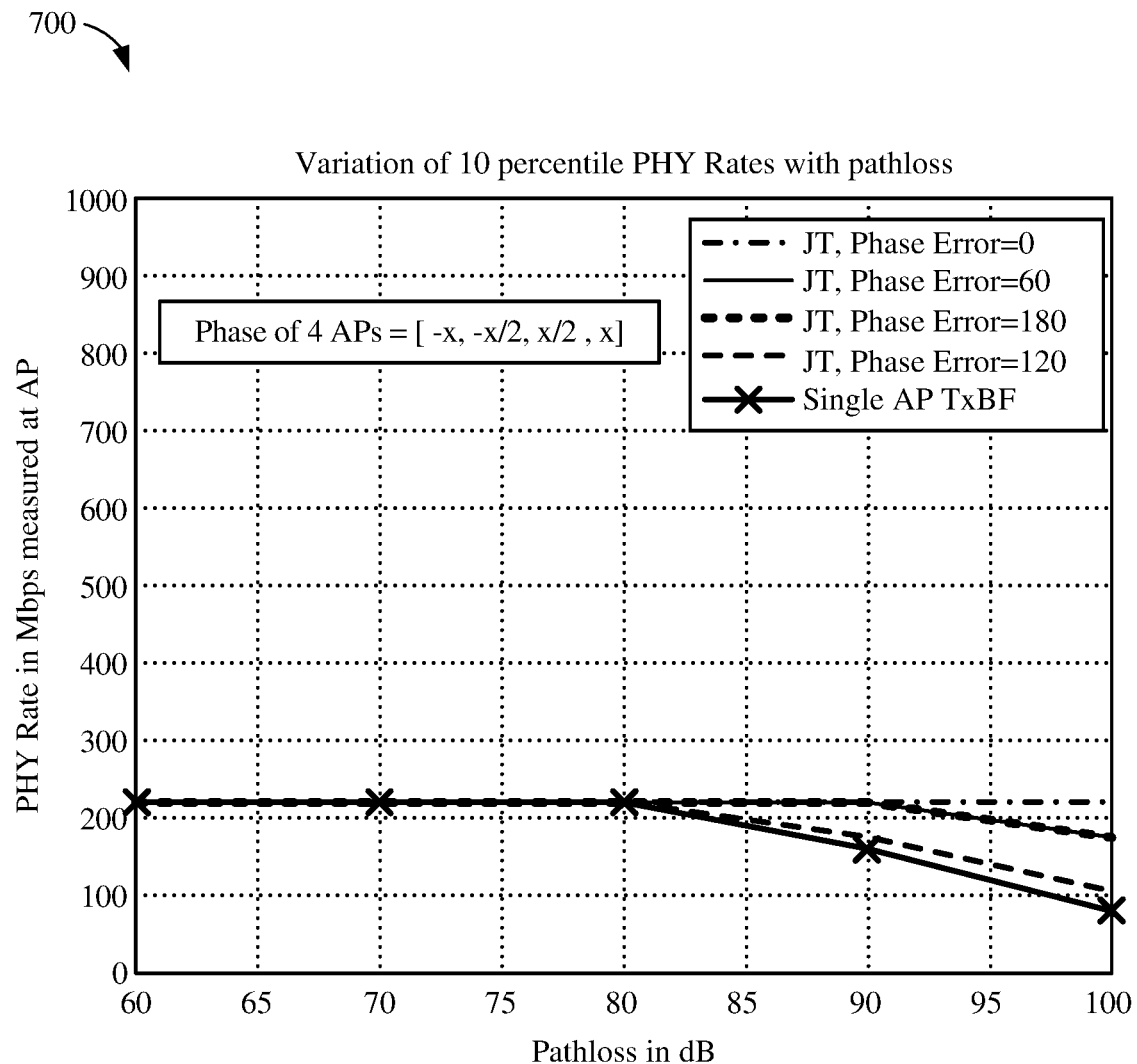
FIG. 7 is a graph depicting performance gains of transmitting beamformed data to a station (STA) from a plurality of access points (APs).

FIG. 7 is a graph 700 depicting performance gains based on transmitting beamformed data to a station (STA) from a plurality of access points (APs). The graph 700 assumes four APs each having 4 transmit antennas. The overall gain is based on the relative phase offset (or phase error), which is 60 degrees between each of the 4 APs. As shown in the graph 700, data rates decrease as the phase error between the APs increases.

Figure 8:
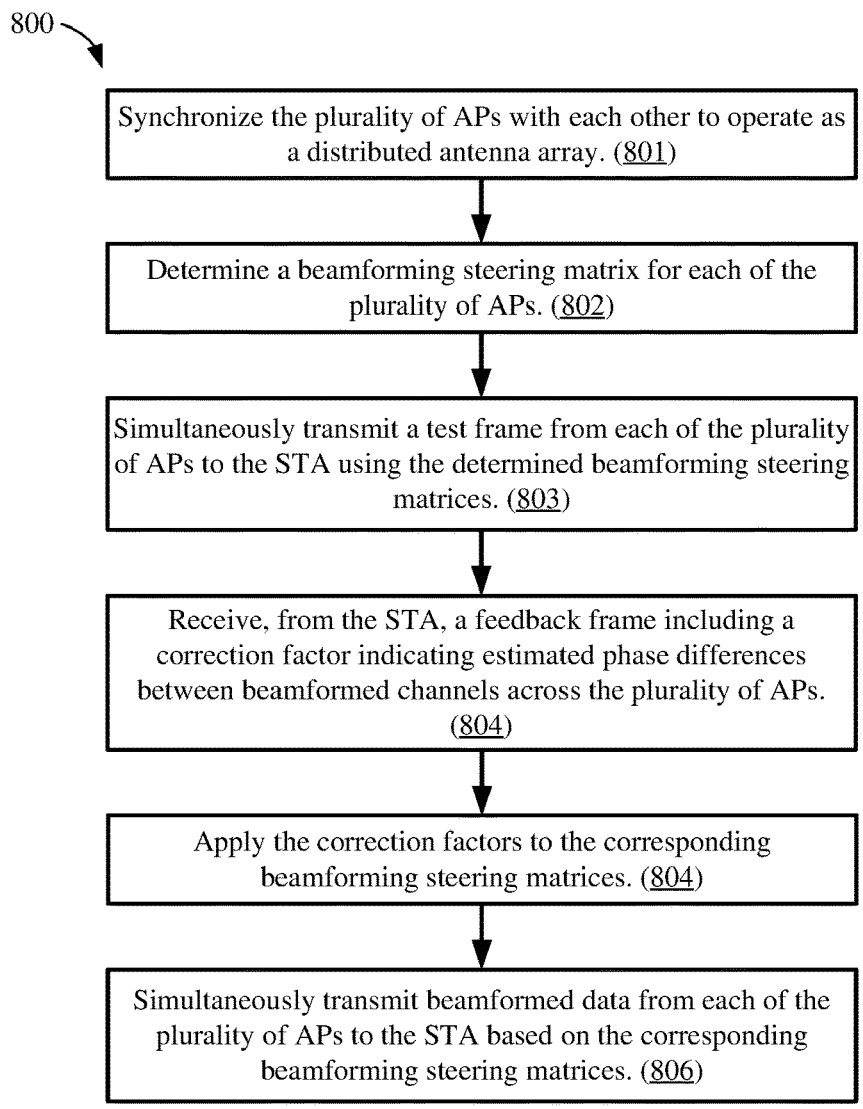
FIG. 8 shows an illustrative flow chart depicting an example process for transmitting beamformed data to a STA from a plurality of APs according to some implementations.

FIG. 8 shows an illustrative flow chart depicting an example process 800 for transmitting beamformed data to a station (STA) from a plurality of access points (APs). The example process 800 may be performed between any suitable access points (such as the APs 110-115 of FIG. 1 or the AP 300 of FIG. 3) and any suitable station (such as the STA of FIG. 1 or the STA 200 of FIG. 2).

The plurality of APs may be synchronized with each other to operate as a distributed antenna array (801). In some implementations, the plurality of APs may be synchronized with each other by synchronizing the phases and frequencies of their carrier signals with each other. In some aspects, each of the APs may synchronize its carrier signal with a target carrier signal. The target carrier signal may be provided by a central controller, by a selected one of the plurality of APs, or by any other suitable device. When synchronized with each other to operate as a distributed antenna array, the plurality of APs may simultaneously transmit beamformed data that constructively adds together at the STA in a manner that increases beamforming gain and power gain (as compared with beamformed data transmissions from a single AP).

Figure 9:
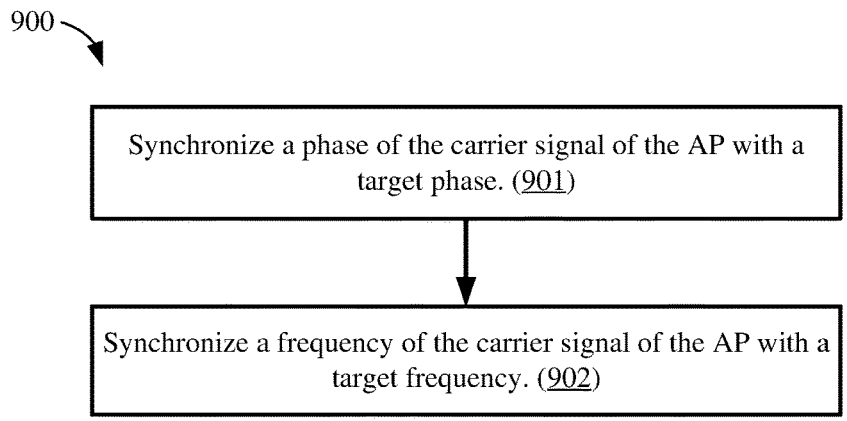
FIG. 9 shows an illustrative flow chart depicting an example process for synchronizing an AP according to some implementations.

For example, FIG. 9 shows an illustrative flow chart depicting an example process 900 for synchronizing an AP. The AP may synchronize the phase of its carrier signal with a target phase (901). In some implementations, each of the plurality of APs may receive a series of synchronization signals, each including a correction factor indicating estimated phase differences between beamformed channels across the plurality of APs. The AP may synchronize the frequency of its carrier signal with a target frequency (902).

Referring again to FIG. 8, each of the plurality of APs may determine a beamforming steering matrix (802). In some implementations, each of the plurality of APs may determine its corresponding beamforming steering matrix based on an explicit sounding operation with the STA. In other implementations, each of the plurality of APs may determine its corresponding beamforming steering matrix based on an implicit sounding operation with the STA.

Each of the plurality of APs may simultaneously transmit a test frame to the STA (803). In some implementations, the APs may simultaneously transmit the test frame as beamformed spatial streams using their respective generated beamforming steering matrices. The STA may receive the beamformed test frames, and may estimate phase differences between beamformed channels across the plurality of APs based on the test frame.

Each of the plurality of APs receives, from the STA, a feedback frame including a correction factor indicating estimated phase differences between beamformed channels across the plurality of APs (804). In some implementations, the APs may adjust their corresponding beamforming steering matrices based on the correction factor(s) provided by the STA (805).

The plurality of APs may simultaneously transmit beamformed data to the STA based on their corresponding beamforming steering matrices (806). In some implementations, AP0 and AP1 simultaneously transmit the data to the STA as beamformed spatial streams using their adjusted beamforming steering matrices.

Figure 10A:
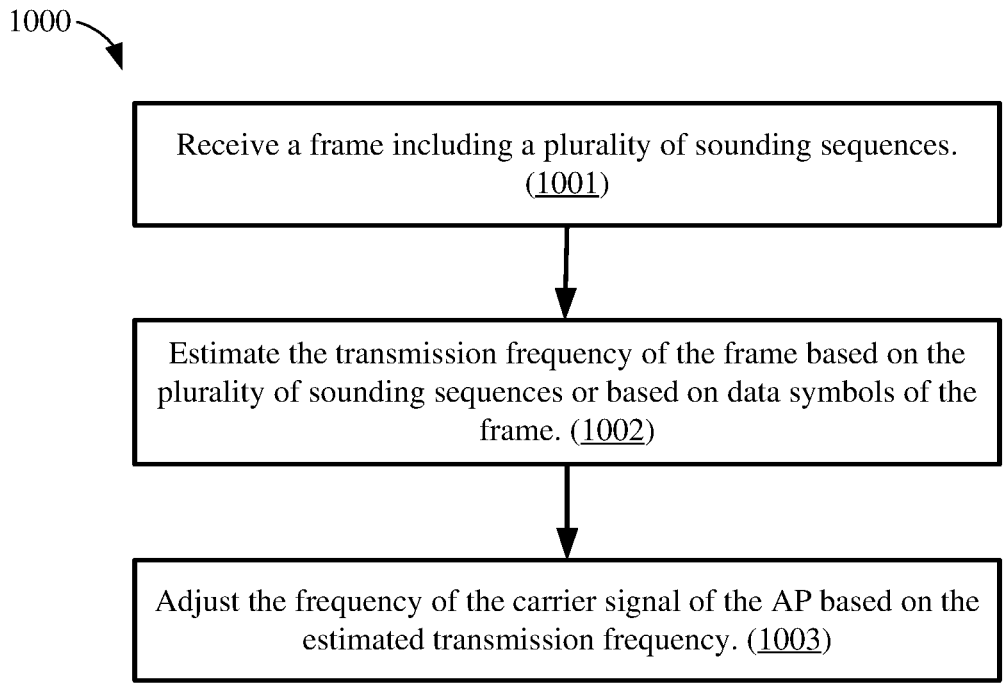
FIG. 10A shows an illustrative flow chart depicting an example process for synchronizing the carrier signal frequency of an AP according to some implementations.

FIG. 10A shows an illustrative flow chart depicting an example process 1000 for synchronizing the carrier signal frequency of an AP. The example process 1000 may be performed by any suitable access point (such as one of the APs 110-115 of FIG. 1 or the AP 300 of FIG. 3). The AP may receive a frame including a plurality of sounding sequences (1001), and may estimate the transmission frequency of the frame based on the plurality of sounding sequences or based on data symbols of the frame (1002). The AP may adjust the frequency of its carrier signal based on the estimated transmission frequency (1003).

Figure 10B:
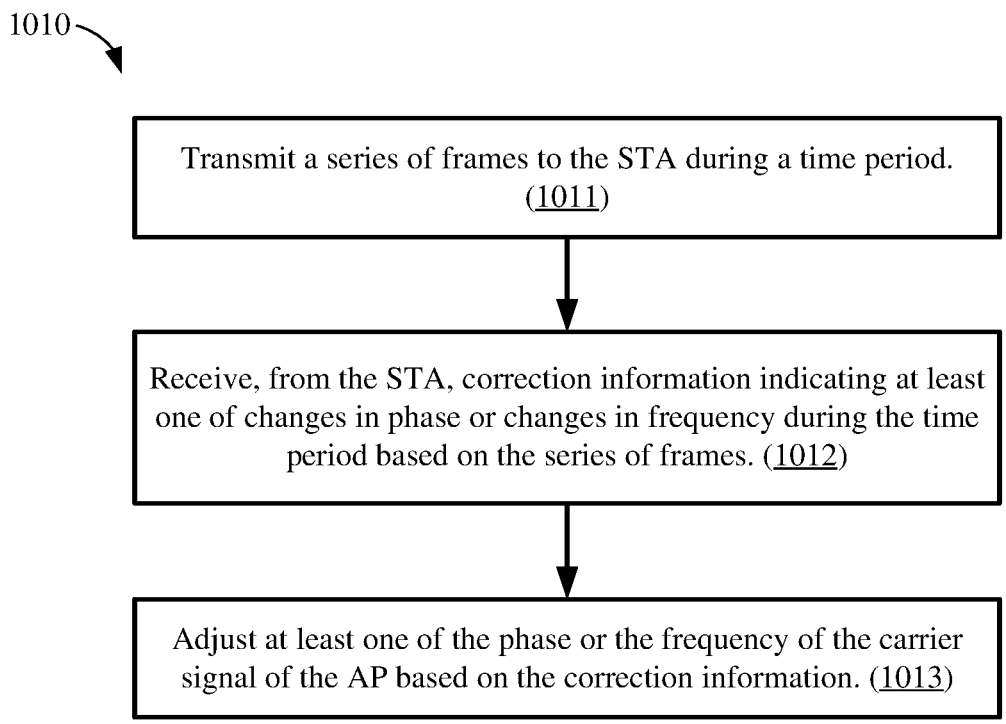
FIG. 10B shows an illustrative flow chart depicting another example process for synchronizing the carrier signal frequency of an AP according to some implementations.

FIG. 10B shows an illustrative flow chart depicting another example process 1010 for synchronizing the carrier signal frequency of an AP. The example process 1010 may be performed by any suitable access point (such as one of the APs 110-115 of FIG. 1 or the AP 300 of FIG. 3). The AP may transmit a series of frames to the STA during a time period (1011). The AP may receive, from the STA, correction information indicating at least one of changes in phase or changes in frequency during the time period based on the series of frames (1012). The AP may adjust at least one of the phase or the frequency of its carrier signal based on the correction information (1013).

Figure 10C:
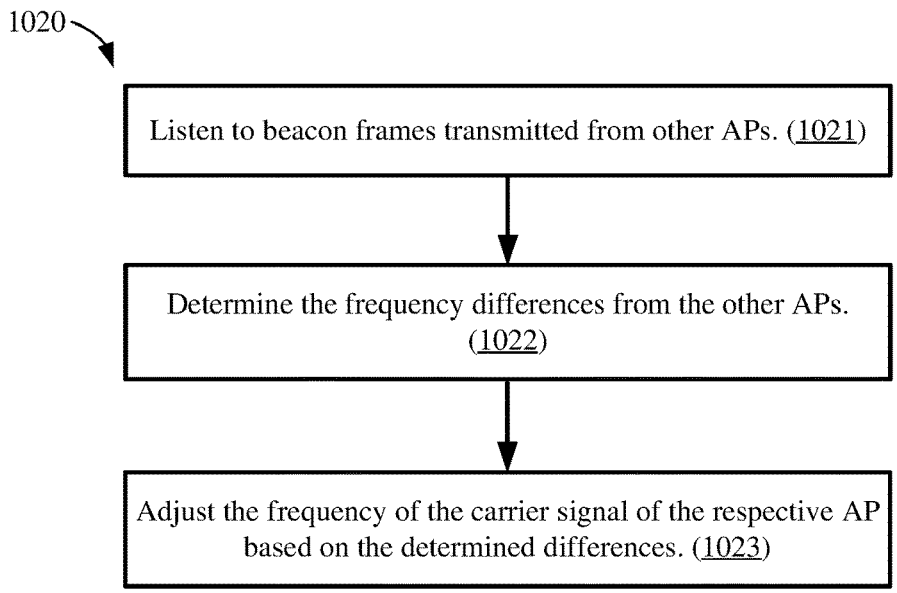
FIG. 10C shows an illustrative flow chart depicting another example process for synchronizing the carrier signal frequency of an AP according to some implementations.

FIG. 10C shows an illustrative flow chart depicting another example process 1020 for synchronizing the carrier signal frequency of an AP. The example process 1020 may be performed by any suitable access point (such as one of the APs 110-115 of FIG. 1 or the AP 300 of FIG. 3). The AP may listen to beacon frames transmitted from other APs (1021). The AP may determine frequency differences between its carrier signal and the carrier signals of the other APs based on information contained in the beacon frames (1022). In some implementations, the AP may synchronize itself with another AP by aligning its local TSF value with one or more TSF values contained in the beacon frames. Then, the AP may adjust the frequency of its carrier signal based on the determined differences (1023).

Figure 11A:
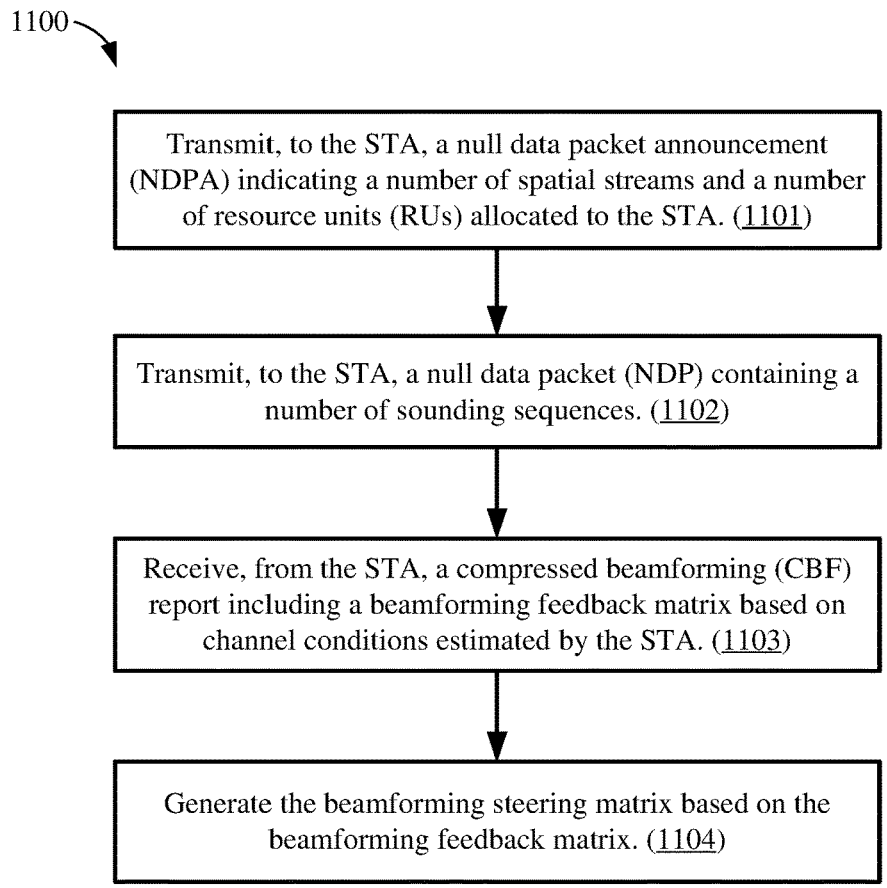
FIG. 11A shows an illustrative flow chart depicting an example process for determining the beamforming steering matrix of an AP according to some implementations.

FIG. 11A shows an illustrative flow chart depicting an example process 1100 for determining the beamforming steering matrix of an AP. The example process 1100 may be performed by any suitable access point (such as one of the APs 110-115 of FIG. 1 or the AP 300 of FIG. 3). The AP may transmit, to the STA, a null data packet announcement (NDPA) indicating a number of spatial streams and a number of resource units (RUs) allocated to the STA (1101). The AP may transmit, to the STA, a null data packet (NDP) containing a number of sounding sequences (1102). The AP may receive, from the STA, a compressed beamforming (CBF) report including a beamforming feedback matrix based on channel conditions estimated by the STA (1103), and may generate the beamforming steering matrix based on the beamforming feedback matrix (1104).

Figure 11B:
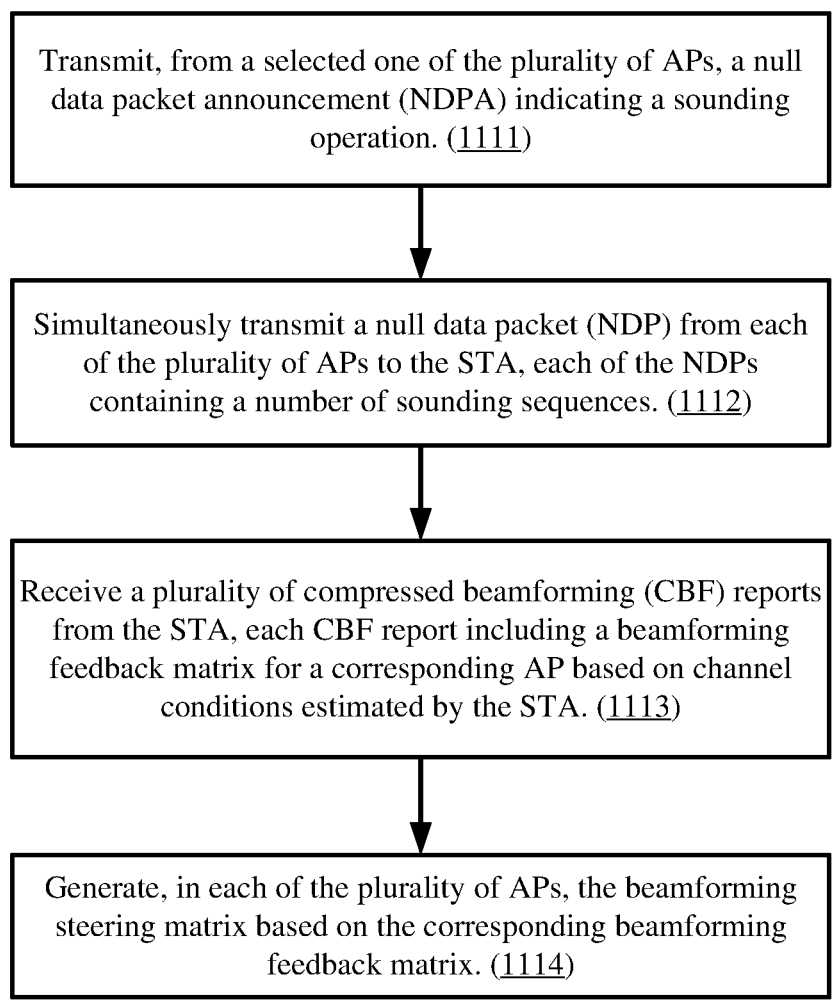
FIG. 11B shows an illustrative flow chart depicting another example process for determining the beamforming steering matrix of an AP according to some implementations.

FIG. 11B shows an illustrative flow chart depicting another example process 1110 for determining the beamforming steering matrix of an AP. The example process 1110 may be performed by any suitable access point (such as one of the APs 110-115 of FIG. 1 or the AP 300 of FIG. 3). A selected one of the APs may transmit a null data packet announcement (NDPA) indicating a sounding operation (1111). Each of the plurality of APs may simultaneously transmit a null data packet (NDP) to the STA, each of the NDPs containing a number of sounding sequences (1112). Each of the plurality of APs may receive a compressed beamforming (CBF) report from the STA, each CBF report including a beamforming feedback matrix for a corresponding AP based on channel conditions estimated by the STA (1113). Each of the plurality of APs may generate the beamforming steering matrix based on the corresponding beamforming feedback matrix (1114).

Figure 11C:
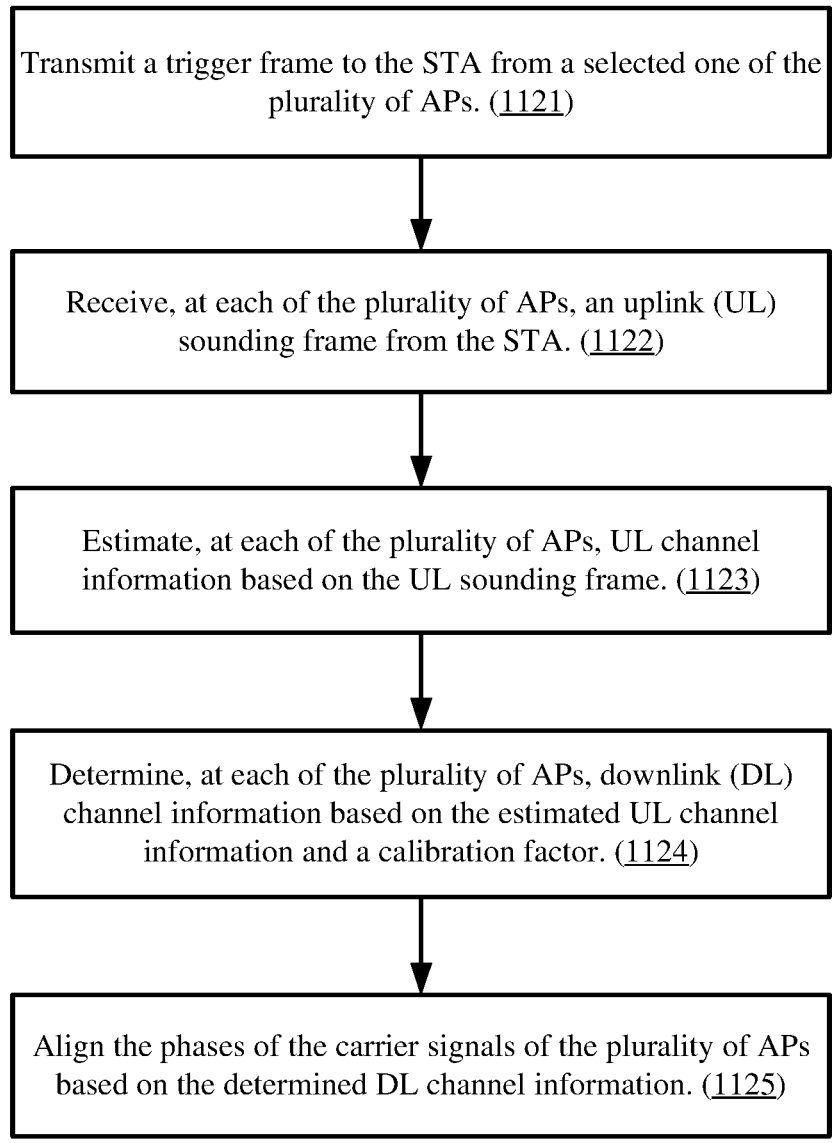
FIG. 11C shows an illustrative flow chart depicting another example process for determining the beamforming steering matrix of an AP according to some implementations.

FIG. 11C shows an illustrative flow chart depicting another example process 1120 for determining the beamforming steering matrix of an AP. The example process 1120 may be performed by any suitable access point (such as one of the APs 110-115 of FIG. 1 or the AP 300 of FIG. 3). A selected one of the APs may transmit a trigger frame to the STA (1121). Each of the plurality of APs may receive an uplink (UL) sounding frame from the STA (1122). Each of the plurality of APs may estimate UL channel information based on the UL sounding frame (1123). Each of the plurality of APs may determine downlink (DL) channel information based on the estimated UL channel information and a calibration factor (1124). The APs may align the phases of their carrier signals based on the determined DL channel information (1125).

Figure 12:
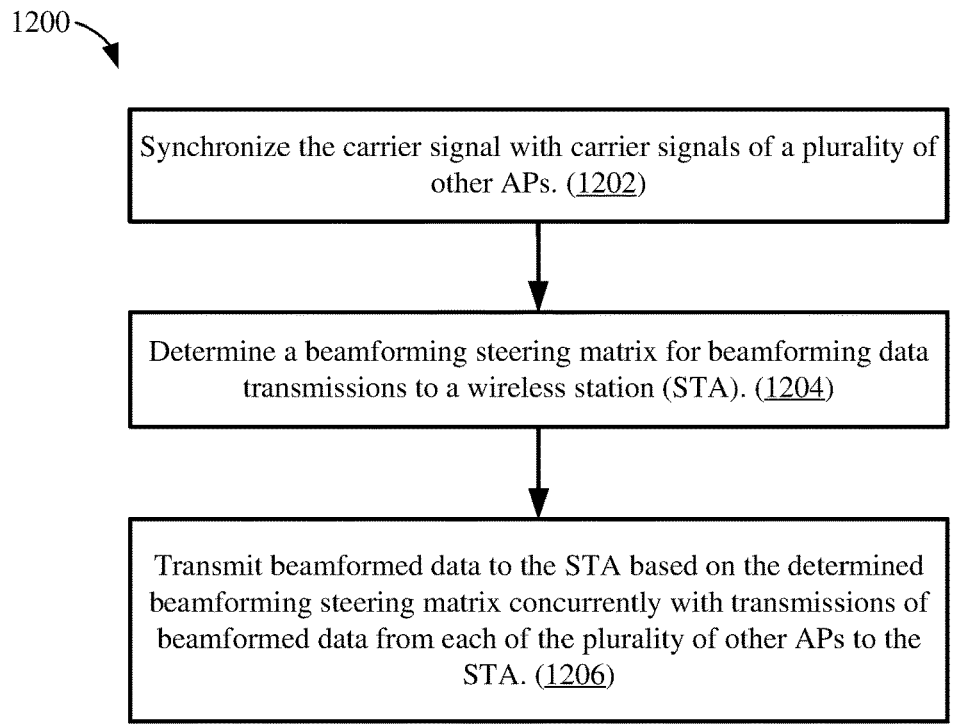
FIG. 12 shows an illustrative flow chart depicting an example process for transmitting beamformed data according to some implementations.

FIG. 12 shows an illustrative flow chart depicting an example process 1200 for transmitting beamformed data according to some implementations. In some implementations, the process 1200 may be performed by a wireless communication device operating as or within an AP, such as one of the APs 110-115 and 300 described above with reference to FIGS. 1 and 3, respectively.

In some implementations, in block 1202, the wireless communication device may synchronize its carrier signal with carrier signals of a plurality of other APs. In block 1204, the wireless communication device may determine a beamforming steering matrix for beamforming data transmissions to a STA. In block 1206, the wireless communication device may transmit beamformed data to the STA based on the determined beamforming steering matrix concurrently with transmissions of beamformed data from each of the plurality of other APs to the STA.

In some implementations, synchronizing the carrier signal in block 1202 includes at least one of synchronizing a phase of the carrier signal with a target phase or synchronizing a frequency of the carrier signal with a target frequency. The target phase or the target frequency (or both) may be provided by a central controller, by a selected one of the plurality of APs, or by any other suitable device.

In some implementations, determining the beamforming steering matrix in block 1204 may be based on one or more sounding operations. For example, each of the plurality of APs may determine its corresponding beamforming steering matrix based on an explicit sounding operation or an implicit sounding operation with the STA.

In some implementations, transmitting beamformed data to the STA in block 1206 includes simultaneously transmitting data from each of the plurality of APs to the STA as beamformed spatial streams using their corresponding beamforming steering matrices. In some other implementations, a respective one of the APs may adjust its beamforming steering matrix based on feedback information provided by the STA. For example, the STA may estimate channel conditions between itself and one or more of the APs, and may transmit a feedback frame containing a plurality of correction factors. Each of the correction factors may indicate an estimated phase difference between a beamformed channel linking the STA to the respective AP and each of one or more other beamformed channels linking the STA to one or more corresponding other APs. In some implementations, each of the APs may adjust its beamforming steering matrix based on a corresponding one of the correction factors.

Figure 13A:
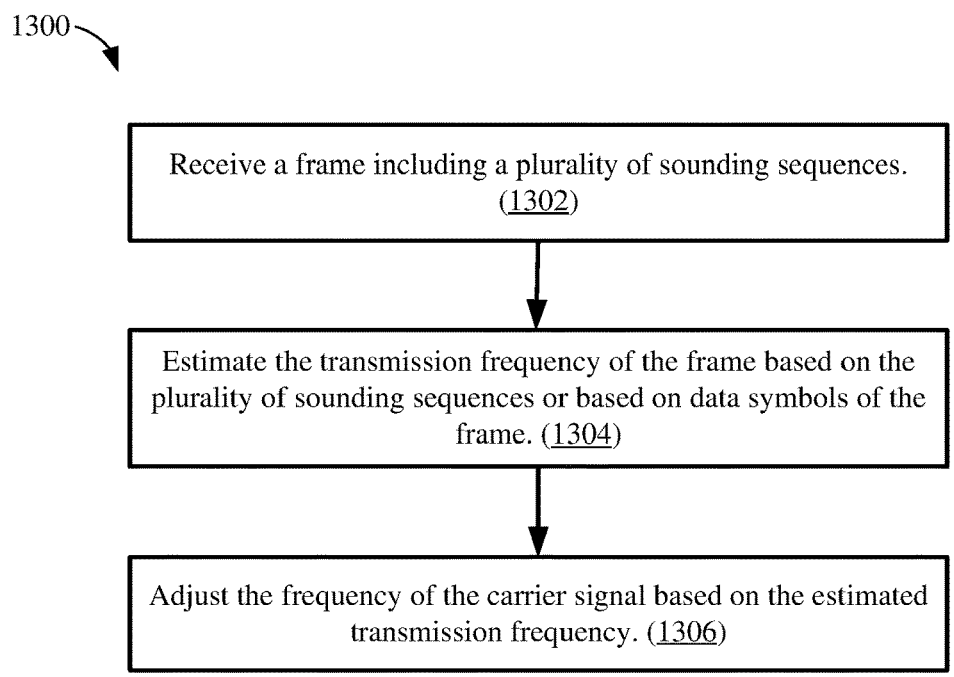
FIG. 13A shows an illustrative flow chart depicting an example process for synchronizing the frequency of a carrier signal of an AP according to some implementations.

FIG. 13A shows an illustrative flow chart depicting an example process 1300 for synchronizing the frequency of an AP's carrier signal according to some implementations. In some implementations, the process 1300 may be performed by a wireless communication device operating as or within an AP, such as one of the APs 110-115 and 300 described above with reference to FIGS. 1 and 3, respectively. For example, the process 1300 may be an example implementation of block 1202 described with reference to FIG. 12.

In some implementations, in block 1302, the wireless communication device may receive a frame including a plurality of sounding sequences. In block 1304, the wireless communication device may estimate the transmission frequency of the frame based on the plurality of sounding sequences or based on data symbols of the frame. In block 1306, the wireless communication device may adjust the frequency of its carrier signal based on the estimated transmission frequency.

In some implementations, the received frame in block 1302 may be an uplink null data packet (UL NDP) containing a plurality of sounding sequences such as HE-LTFs, VHT-LTFs, HT-LTFs, or legacy LTFs. In some aspects, the sounding sequences may be orthogonal to each other, for example, so that each AP can distinguish between sounding sequences transmitted from different antennas of the STA.

In some implementations, estimation of the transmission frequency in block 1304 may be based on the sounding sequences contained in the UL NDP or based on data symbols of the frame. For example, the wireless communication device may use the sounding sequences to estimate channel conditions between itself and the STA, and may derive the frequency of the carrier signal based on the estimated channel conditions.

Figure 13B:
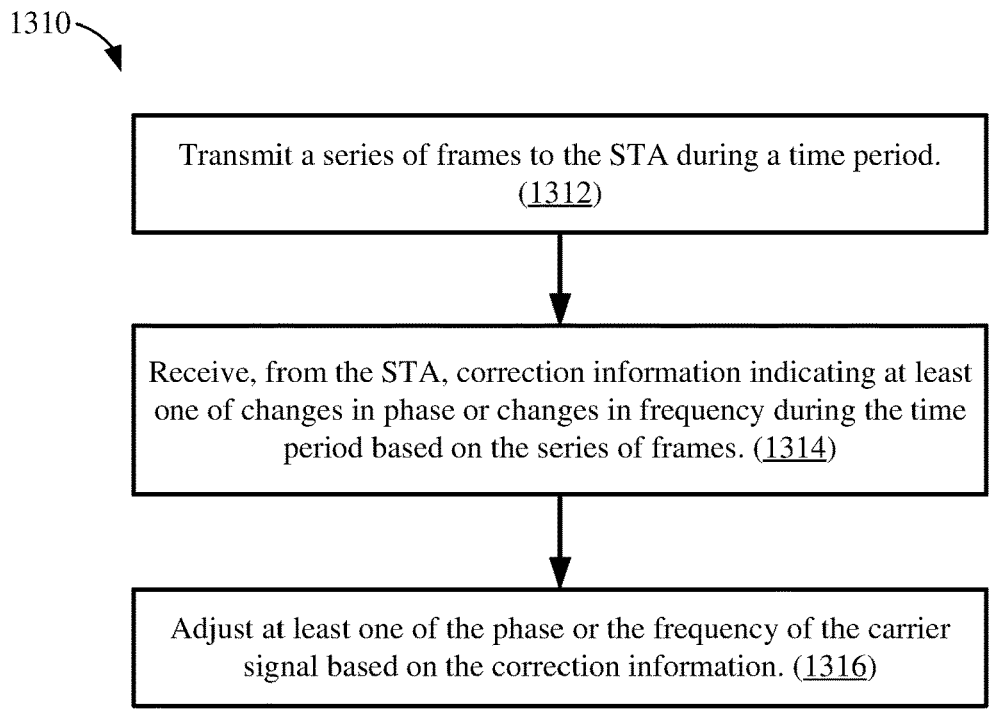
FIG. 13B shows an illustrative flow chart depicting another example process for synchronizing the frequency of a carrier signal of an AP according to some implementations.

FIG. 13B shows an illustrative flow chart depicting another example process 1310 for synchronizing the frequency of an AP's carrier signal according to some implementations. In some implementations, the process 1310 may be performed by a wireless communication device operating as or within an AP, such as one of the APs 110-115 and 300 described above with reference to FIGS. 1 and 3, respectively. For example, the process 1310 may be an example implementation of block 1202 described with reference to FIG. 12.

In some implementations, in block 1312, the wireless communication device may transmit a series of frames to the STA during a time period. In block 1314, the wireless communication device may receive, from the STA, correction information indicating at least one of changes in phase or changes in frequency of the carrier signal during the time period based on the series of frames. In block 1316, the wireless communication device may adjust at least one of the phase or the frequency of the carrier signal based at least in part on the correction information.

In some implementations, each of the frames in block 1312 may be a test frame concurrently transmitted from multiple APs as beamformed spatial streams based on their corresponding beamforming steering matrices. The correction information in block 1314 may indicate a frequency offset between the carrier frequency of the first AP and a target carrier frequency.

Figure 13C:
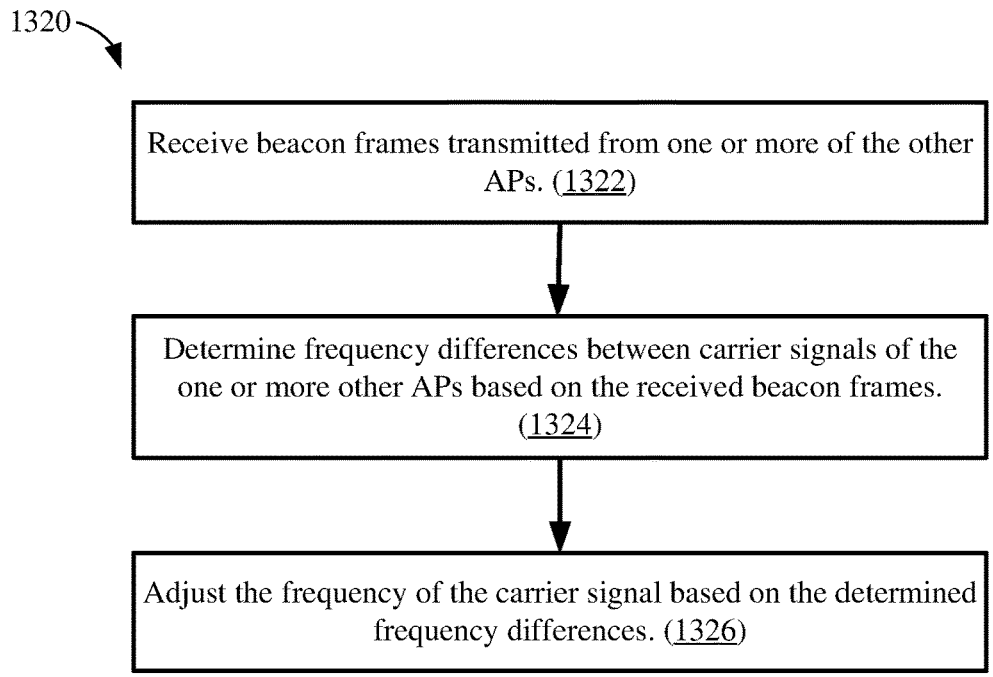
FIG. 13C shows an illustrative flow chart depicting another example process for synchronizing the frequency of a carrier signal of an AP according to some implementations.

FIG. 13C shows an illustrative flow chart depicting another example process 1320 for synchronizing the frequency of an AP's carrier signal according to some implementations. In some implementations, the process 1320 may be performed by a wireless communication device operating as or within an AP, such as one of the APs 110-115 and 300 described above with reference to FIGS. 1 and 3, respectively. For example, the process 1320 may be an example implementation of block 1202 described with reference to FIG. 12.

In some implementations, in block 1322, the wireless communication device may receive beacon frames transmitted from one or more of the other APs. In block 1324, the wireless communication device may determine frequency differences between carrier signals of the one or more other APs based on the received beacon frames. In block 1326, the wireless communication device may adjust the frequency of the carrier signal based on the determined frequency differences.

In some implementations, the beacon frames in block 1322 may include one or more TSF values, and determining the frequency differences between carrier signals in block 1324 may allow the wireless communication device to synchronize itself with another AP by aligning its local TSF value with one or more TSF values contained in the beacon frames.

Figure 14:
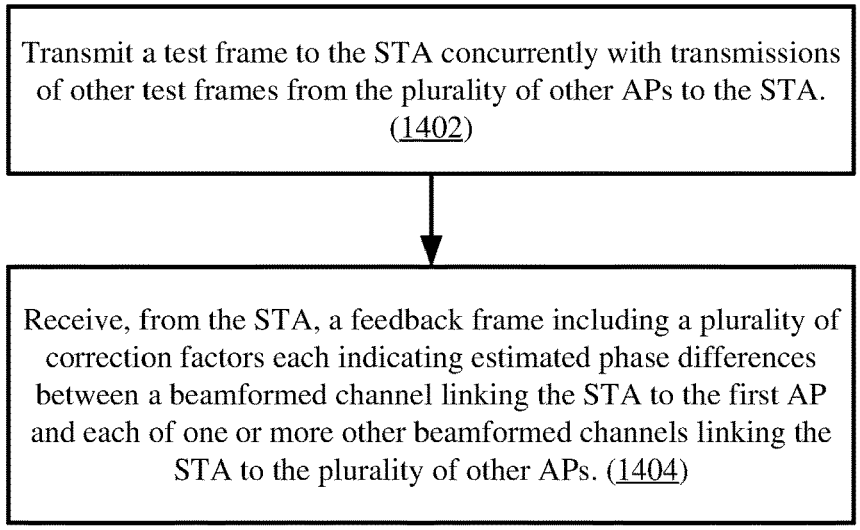
FIG. 14 shows an illustrative flow chart depicting another example process for transmitting beamformed data according to some implementations.

FIG. 14 shows an illustrative flow chart depicting another example process 1400 for transmitting beamformed data according to some implementations. In some implementations, the process 1400 may be performed by a wireless communication device operating as or within an AP, such as one of the APs 110-115 and 300 described above with reference to FIGS. 1 and 3, respectively. For example, the process 1400 may begin after transmitting the beamformed data in block 1206 of FIG. 12.

In some implementations, in block 1402, the wireless communication device may transmit a test frame to the STA concurrently with transmissions of other test frames from the plurality of other APs to the STA. In block 1404, the wireless communication device may receive, from the STA, a feedback frame including a plurality of correction factors each indicating estimated phase differences between a beamformed channel linking the STA to the first AP and each of one or more other beamformed channels linking the STA to the plurality of other APs.

In some implementations, the test frame in block 1402 may be transmitted to the STA by a plurality of APs as beamformed spatial streams. For example, the beamformed spatial streams may be based on corresponding beamforming steering matrices include. In some implementations, the feedback frame in block 1404 may include one or more correction factors indicating estimated phase differences between beamformed channels across a multitude of APs.

Figure 15:
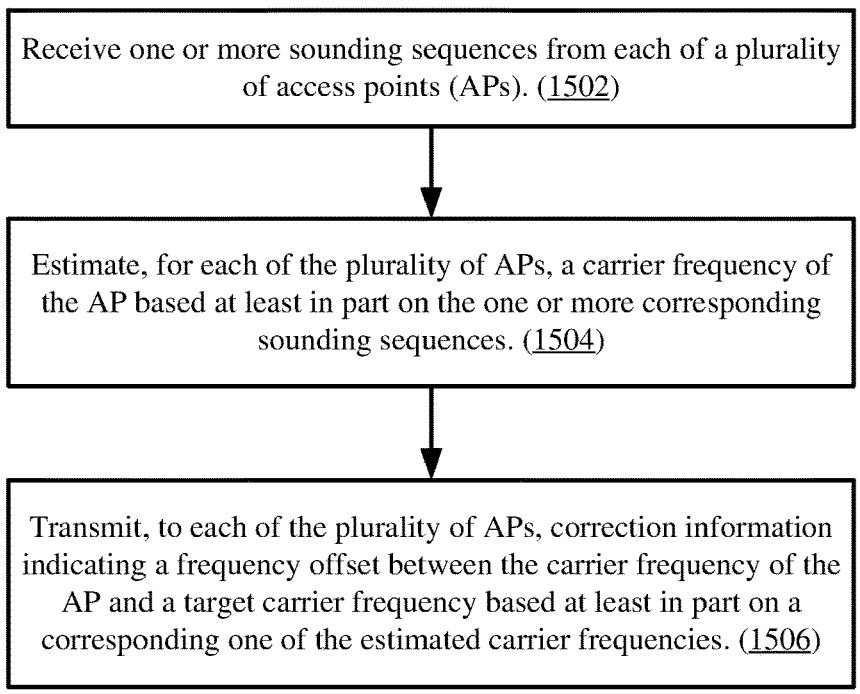
FIG. 15 shows an illustrative flow chart depicting an example process for generating correction information indicative of frequency offsets of a carrier signal according to some implementations.

FIG. 15 shows an illustrative flow chart depicting an example process 1500 for generating correction information indicative of frequency offsets of a carrier signal according to some implementations. In some implementations, the process 1500 may be performed by a wireless communication device operating as or within a STA, such one of the STAs described above with reference to FIGS. 1 and 2.

In some implementations, in block 1502, the wireless communication device may receive one or more sounding sequences from each of a plurality of APs. In block 1504, the wireless communication device may estimate, for each of the plurality of APs, a carrier frequency of the AP based at least in part on the one or more corresponding sounding sequences. In block 1506, the wireless communication device may transmit, to each of the plurality of APs, correction information indicating a frequency offset between the carrier frequency of the AP and a target carrier frequency based at least in part on a corresponding one of the estimated carrier frequencies.

Figure 16A:
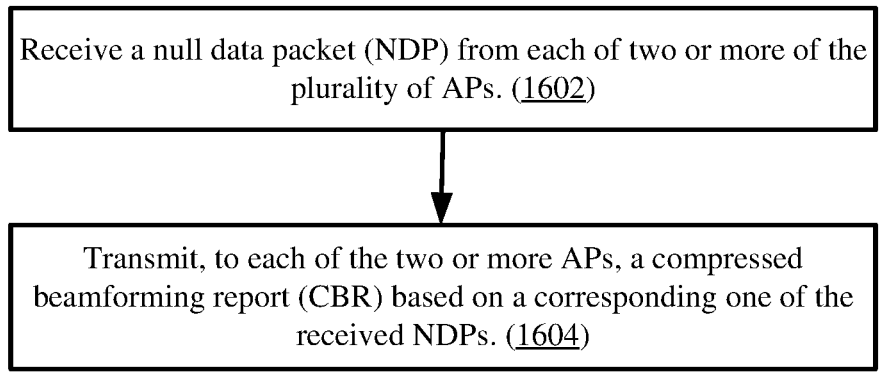
FIG. 16A shows an illustrative flow chart depicting an example process for generating a compressed beamforming report according to some implementations.

FIG. 16A shows an illustrative flow chart depicting an example process 1600 for generating a compressed beamforming report according to some implementations. In some implementations, the process 1600 may be performed by a wireless communication device operating as or within a STA, such one of the STAs described above with reference to FIGS. 1 and 2. For example, the process 1600 may begin after transmitting the correction information in block 1506 of FIG. 15.

In some implementations, in block 1602, the wireless communication device may receive a NDP from each of two or more of the plurality of APs. In block 1604, the wireless communication device may transmit, to each of the two or more APs, a CBR based on a corresponding one of the received NDPs. The CBR may include a beamforming feedback matrix based on channel conditions estimated by the wireless communication device, and each of the two or more APs may use the beamforming feedback matrix contained in the CBF report to generate their respective beamforming steering matrices.

In some implementations, the NDP in block 1602 may include a plurality of sounding sequences from which the STA can estimate channel conditions between itself and a respective one of the transmitting APs. The sounding sequences may be any suitable sequence or pattern that is known to the STA. For example, the sounding sequences contained in the NDP may be HE-LTFs, VHT-LTFs, HT-LTFs, or legacy LTFs. In some implementations, the sounding sequences may be orthogonal to each other, for example, so that the STA can distinguish between sounding sequences transmitted from different antennas of a given AP.

In some implementations, the CBR in block 1604 may include a beamforming feedback matrix based on channel conditions estimated by the STA. The AP may receive the CBF report, and may use the beamforming feedback matrix contained in the CBF report to generate the beamforming steering matrix.

Figure 16B:
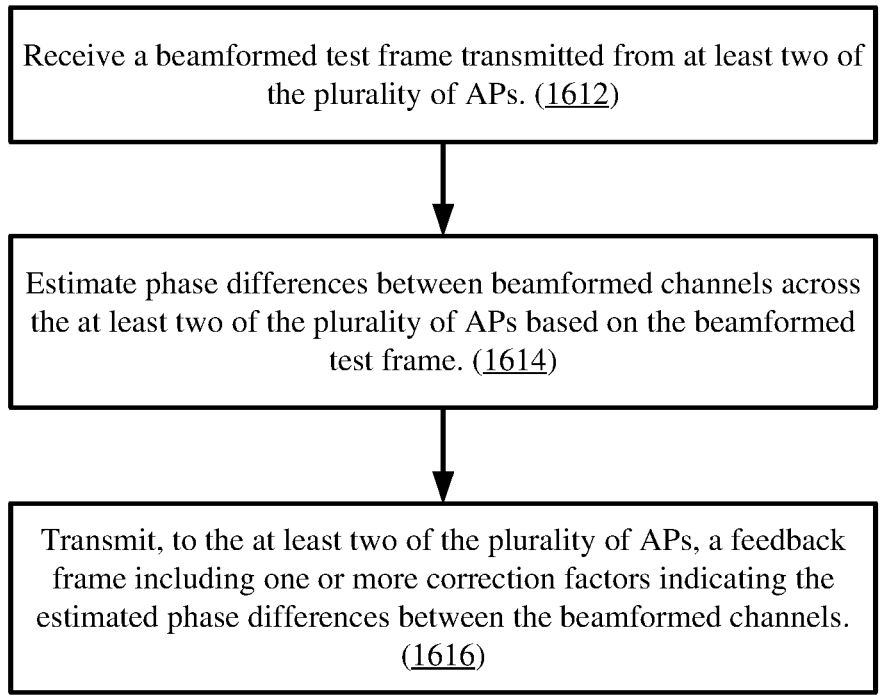
FIG. 16B shows an illustrative flow chart depicting another example process for generating a compressed beamforming report according to some implementations.

FIG. 16B shows an illustrative flow chart depicting another example process 1610 for generating a compressed beamforming report according to some implementations. In some implementations, the process 1610 may be performed by a wireless communication device operating as or within a STA, such one of the STAs described above with reference to FIGS. 1 and 2. For example, the process 1610 may begin after transmitting the correction information in block 1506 of FIG. 15.

In some implementations, in block 1612, the wireless communication device may receive a beamformed test frame transmitted from at least two of the plurality of APs. In block 1614, the wireless communication device may estimate phase differences between beamformed channels across the at least two of the plurality of APs based on the beamformed test frame. In block 1616, the wireless communication device may transmit, to the at least two of the plurality of APs, a feedback frame including one or more correction factors indicating the estimated phase differences between the beamformed channels.

Figure 17:
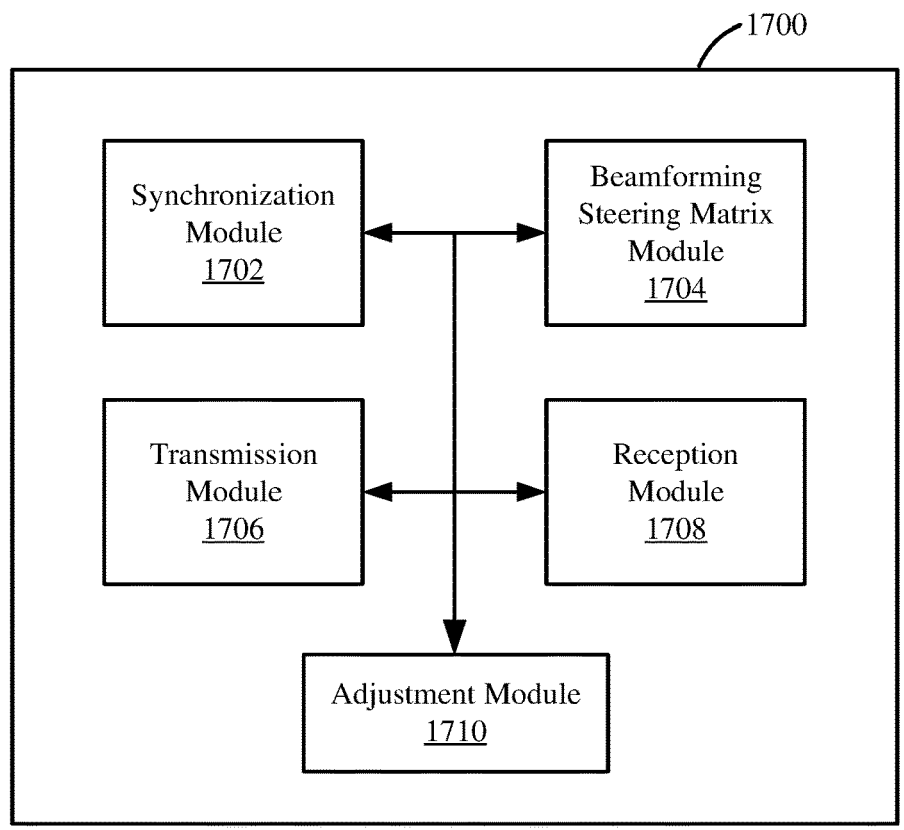
FIG. 17 shows a block diagram of an example wireless communication device according to some implementations.

FIG. 17 shows a block diagram of an example wireless communication device 1700 according to some implementations. In some implementations, the wireless communication device 1700 is configured to perform one or more of the processes described above with reference to FIGS. 8, 9, 10A, 10B, 10C, 11A, 11B, 11C, 12, 13A, 13B, 13C, 14, 15, 16A, and 16B. The wireless communication device 1700 can be a chip, SoC, chipset, package or device that includes at least one processor and at least one modem (for example, a Wi-Fi (IEEE 802.11) modem or a cellular modem). In some implementations, the wireless communication device 1700 can be a device for use in an AP, such as one of the APs 110-115 and 300 described above with reference to FIGS. 1 and 3, respectively. In some other implementations, the wireless communication device 1700 can be an AP that includes such a chip, SoC, chipset, package, or device as well as at least one transmitter, at least one receiver, and at least one antenna.

The wireless communication device 1700 includes a synchronization module 1702, a beamforming steering matrix module 1704, a transmission module 1706, a reception module 1708, and an adjustment module 1710. Portions of one or more of the modules 1702, 1704, 1706, 1708, and 1710 may be implemented at least in part in hardware or firmware. For example, the transmission module 1706 and the reception module 1708 may be implemented at least in part by a modem (such as the transceivers 311 of FIG. 3). In some implementations, at least some of the modules 1702, 1704, 1706, 1708, and 1710 are implemented at least in part as software stored in a memory (such as the memory 340 of FIG. 3). For example, portions of one or more of the modules 1702, 1704, and 1710 can be implemented as non-transitory instructions (or "code") executable by a processor (such as the processor 330 of FIG. 3) to perform the functions or operations of the respective module.

The synchronization module 1702 is configured to synchronize a carrier signal of the wireless communication device 1700 with carrier signals of a plurality of other wireless communication devices (such as a plurality of APs).

The beamforming steering matrix module 1704 is configured to determine a beamforming steering matrix for beamforming data transmissions to a wireless station (STA).

The transmission module 1706 is configured to transmit data, frames, packets, and other wireless signals to other wireless communication devices. In some implementations, the transmission module 1706 may be configured to transmit one or more of beamformed data to the STA, a series of synchronization signals to other wireless communication devices, and a test frame to one or more STAs.

The reception module 1708 is configured to receive data, frames, packets, and other wireless signals from other wireless communication devices. In some implementations, the reception module 1708 may be configured to receive one or more of a series of synchronization signals, a frame including a plurality of sounding sequences, correction information, beacon frames, and feedback frames.

The adjustment module 1710 is configured to adjust the frequency of the carrier signal of the wireless communication device 1700 based on one or more of frequency differences between carrier signals of other wireless communication devices the one or more other APs, a transmission frequency of frames containing sounding sequences, correction information provided by one or more other wireless communication devices.

Figure 18:
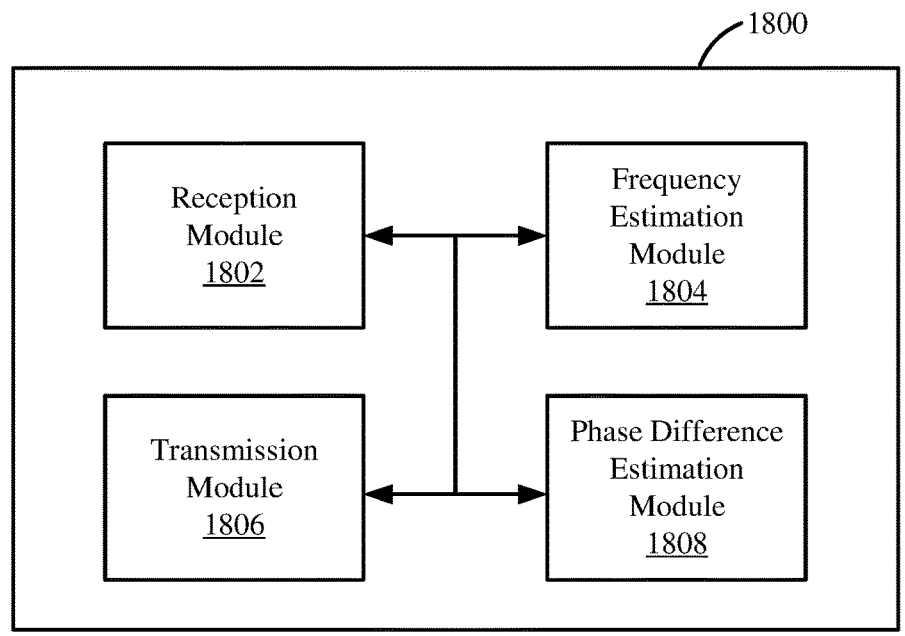
FIG. 18 shows a block diagram of another example wireless communication device according to some implementations.

FIG. 18 shows a block diagram of an example wireless communication device 1800 according to some implementations. In some implementations, the wireless communication device 1800 is configured to perform one or more of the processes described above with reference to FIGS. 8, 9, 10A, 10B, 10C, 11A, 11B, 11C, 12, 13A, 13B, 13C, 14, 15, 16A, and 16B. The wireless communication device 1800 can be a chip, SoC, chipset, package or device that includes at least one processor and at least one modem (for example, a Wi-Fi (IEEE 802.11) modem or a cellular modem). In some implementations, the wireless communication device 1800 can be a device for use in a STA, such as one of the STAs and 200 described above with reference to FIGS. 1 and 2, respectively. In some other implementations, the wireless communication device 1800 can be a STA that includes such a chip, SoC, chipset, package, or device as well as at least one transmitter, at least one receiver, and at least one antenna.

The wireless communication device 1800 includes a reception module 1802, a frequency estimation module 1804, a transmitting module 1806, and a phase difference estimation module 1808. Portions of one or more of the modules 1802, 1804, 1806, and 1808 may be implemented at least in part in hardware or firmware. For example, the reception module 1802 and the transmitting module 1806 may be implemented at least in part by a modem (such as the transceivers 211 of FIG. 2). In some implementations, at least some of the modules 1802, 1804, 1806, and 1808 are implemented at least in part as software stored in a memory (such as the memory 240 of FIG. 2). For example, portions of one or more of the modules 1804 and 1808 can be implemented as non-transitory instructions (or "code") executable by a processor (such as the processor 230 of FIG. 2) to perform the functions or operations of the respective module.

The reception module 1802 is configured to receive data, frames, packets, and other wireless signals from other wireless communication devices. In some implementations, the reception module 1802 may be configured to receive one or more of.

The frequency estimation module 1804 is configured to estimate the carrier frequency for one or more other wireless communication devices, to estimate phase differences between beamformed channels across a plurality of other wireless communication devices, or both.

The transmission module 1806 is configured to is configured to transmit data, frames, packets, and other wireless signals to other wireless communication devices. In some implementations, the transmission module 1806 may be configured to transmit one or more of correction information, compressed beamforming reports (CBRs), and feedback frames.

The phase difference estimation module 1808 is configured to estimate phase differences between beamformed channels across a plurality of other wireless communication devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication at an access point (AP), comprising:
    synchronizing a carrier signal of the AP with carrier signals of a plurality of other APs;
    transmitting a test frame to a wireless station (STA) using the synchronized carrier signal and a beamforming steering matrix, the transmission of the test frame being concurrent with transmissions of other test frames from the plurality of other APs to the STA;
    receiving, from the STA, a feedback frame including a plurality of correction factors indicating estimated phase differences between a beamformed channel linking the STA to the AP and one or more other beamformed channels linking the STA to the plurality of other APs;
    adjusting the beamforming steering matrix based at least in part on one or more of the plurality of correction factors; and
    transmitting beamformed data to the STA using the synchronized carrier signal and the adjusted beamforming steering matrix, the transmission of the beamformed data being concurrent with transmissions of beamformed data from the plurality of other APs to the STA.

2. The method of claim 1, further comprising:
    configuring the AP to operate as part of a distributed antenna array in conjunction with the plurality of other APs.

3. The method of claim 1, wherein the transmissions of beamformed data from the plurality of other APs are based at least in part on a corresponding one of a plurality of other beamforming steering matrices.

4. The method of claim 1, wherein synchronizing the carrier signal includes at least one of:
    synchronizing a phase of the carrier signal based at least in part on a target phase; or
    synchronizing a frequency of the carrier signal based at least in part on a target frequency.

5. The method of claim 4, further comprising:
    receiving a series of synchronization signals, each synchronization signal including a correction value indicative of a phase offset between the carrier signal and a target carrier signal; and
    adjusting the phase of the carrier signal based at least in part on the correction value included in at least one synchronization signal of the series of synchronization signals and the target frequency.

6. The method of claim 4, further comprising:
    receiving a frame from the STA, the frame including a plurality of sounding sequences; and
    estimating channel conditions based at least in part on the plurality of sounding sequences, wherein the beamforming steering matrix is based at least in part on the estimated channel conditions.

7. The method of claim 4, further comprising:
    transmitting a series of frames to the STA during a time period;
    receiving, from the STA, correction information indicating changes in frequency of the carrier signal during the time period, wherein the correction information is based at least in part on the series of frames; and
    adjusting the frequency of the carrier signal based at least in part on the correction information and the target frequency.

8. The method of claim 4, further comprising:
    receiving beacon frames transmitted from one or more of the plurality of other APs; and
    adjusting the frequency of the carrier signal based at least in part on frequency differences between one or more of the carrier signals of the plurality of other APs and the target frequency, wherein the frequency differences are based at least in part on the received beacon frames.

9. The method of claim 1, further comprising:
    transmitting a series of synchronization signals to at least one of the plurality of other APs, wherein each of the synchronization signals includes a correction value indicative of a phase offset between the carrier signal of the at least one of the plurality of other APs and a target carrier signal.

10. The method of claim 1, wherein the concurrent transmissions of the other test frames from the plurality of other APs are based at least in part on a corresponding plurality of beamforming steering matrices for the plurality of other APs.

11. The method of claim 1, wherein the transmission of the test frame from the AP and the concurrent transmissions of the other test frames from the plurality of other APs comprise beamformed spatial streams.

12. An access point (AP) comprising:
    at least one processor;
    a transceiver; and
    at least one memory comprising instructions executable by the at least one processor to cause the AP to:
        synchronize a carrier signal of the AP with carrier signals of a plurality of other APs;
        transmit, via the transceiver, a test frame to a wireless station (STA) using the synchronized carrier signal and a beamforming steering matrix, the transmission of the test frame being concurrent with transmissions of other test frames from the plurality of other APs to the STA;
        receive, from the STA via the transceiver, a feedback frame including a plurality of correction factors indicating estimated phase differences between a beamformed channel linking the STA to the AP and one or more other beamformed channels linking the STA to the plurality of other APs;
        adjust the beamforming steering matrix based at least in part on one or more of the plurality of correction factors; and
        transmit, via the transceiver, beamformed data to the STA using the synchronized carrier signal and the adjusted beamforming steering matrix, the transmission of the beamformed data being concurrent with transmissions of beamformed data from the plurality of other APs to the STA.

13. The AP of claim 12, wherein the instructions to synchronize the carrier signal are executable by the at least one processor to cause the AP to:
synchronize a phase of the carrier signal based at least in part on a target phase; or
synchronize a frequency of the carrier signal based at least in part on a target frequency.

14. The AP of claim 13, wherein the instructions are further executable by the at least one processor to cause the AP to:
receive, via the transceiver, a series of synchronization signals, each synchronization signal including a correction value indicative of a phase offset between the carrier signal and a target carrier signal; and
adjust the phase of the carrier signal based at least in part on the correction value included in at least one synchronization signal of the series of synchronization signals and the target frequency.

15. The AP of claim 13, wherein the instructions are further executable by the at least one processor to cause the AP to:
transmit, via the transceiver, a series of frames to the STA during a time period;
receive, from the STA via the transceiver, correction information indicating changes in frequency of the carrier signal during the time period, wherein the correction information is based at least in part on the series of frames; and
adjust the frequency of the carrier signal based at least in part on the correction information and the target frequency.

16. The AP of claim 13, wherein the instructions are further executable by the at least one processor to cause the AP to:
receive, via the transceiver, beacon frames transmitted from one or more of the plurality of other APs; and
adjust the frequency of the carrier signal based at least in part on frequency differences between one or more of the carrier signals of the plurality of other APs and the target frequency, wherein the frequency differences are based at least in part on the received beacon frames.

17. The AP of claim 12, wherein the instructions are further executable by the at least one processor to cause the AP to:
receive, via the transceiver, a frame from the STA, the frame including a plurality of sounding sequences; and
estimate channel conditions based at least in part on the plurality of sounding sequences, wherein the beamforming steering matrix is based at least in part on the estimated channel conditions.

18. The AP of claim 12, wherein the instructions are further executable by the at least one processor to cause the AP to:
transmit, via the transceiver, a series of synchronization signals to at least one of the plurality of other APs, wherein the synchronization signals include a correction value indicative of a phase offset between the carrier signal of the at least one of the plurality of other APs and a target carrier signal.

19. The AP of claim 12, wherein the concurrent transmissions of the other test frames from the plurality of other APs are based at least in part on a corresponding plurality of beamforming steering matrices determined for the plurality of other APs.

20. The AP of claim 10, wherein the transmission of the test frame from the AP and the concurrent transmissions of the other test frames from the plurality of other APs comprise beamformed spatial streams.

21. The AP of claim 12, wherein the AP is configured to operate as part of a distributed antenna array in conjunction with the plurality of other APs.

22. The AP of claim 12, wherein the transmissions of beamformed data from the plurality of other APs are based at least in part on a corresponding one of a plurality of other beamforming steering matrices.

* * * * *